(12) United States Patent
Imazu et al.

(10) Patent No.: US 7,827,367 B2
(45) Date of Patent: Nov. 2, 2010

(54) BACKUP CONTROL METHOD FOR ACQUIRING PLURALITY OF BACKUPS IN ONE OR MORE SECONDARY STORAGE SYSTEMS

(75) Inventors: Takeyuki Imazu, Yokohama (JP); Yuri Hiraiwa, Sagamihara (JP); Nobuhiro Maki, Yokohama (JP); Yoshiyuki Nishi, Fujisawa (JP); Kazuhiko Watanabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 461 days.

(21) Appl. No.: 12/007,229

(22) Filed: Jan. 8, 2008

(65) Prior Publication Data
US 2008/0209146 A1 Aug. 28, 2008

(30) Foreign Application Priority Data
Feb. 23, 2007 (JP) ............................. 2007-043295

(51) Int. Cl.
*G06F 12/16* (2006.01)
(52) U.S. Cl. ...................... 711/162; 707/648; 707/649; 707/650; 707/654

(58) Field of Classification Search ................. 711/161, 711/162; 707/648, 649, 650, 654
See application file for complete search history.

(56) References Cited

U.S. PATENT DOCUMENTS

| 7,356,657 B2 * | 4/2008 | Mikami ...................... 711/161 |
| 2008/0168218 A1 * | 7/2008 | Arakawa et al. ............ 711/112 |

FOREIGN PATENT DOCUMENTS

| JP | 2005-18738 | 3/2004 |
| JP | 2006-155676 | 3/2006 |

* cited by examiner

*Primary Examiner*—Jack A Lane
(74) *Attorney, Agent, or Firm*—Foley & Lardner LLP

(57) ABSTRACT

A controller sets a specified time which is a time that specifies a time in the future relative to the current time for all of one or more secondary storage systems. The respective secondary storage systems have a logical volume for backup (BVOL), and set a backup preparation end state when a journal up to a specified time has been established, and report information showing a preparation end state to the controller. The controller issues a backup command to all of the one or more secondary storage systems when information showing a preparation end state is reported from all of the one or more secondary storage systems.

18 Claims, 31 Drawing Sheets

FIG. 6

204 UPDATE DATA INFORMATION TABLE

| # | UPDATE TIME | UPDATE LOCATION | UPDATE CONTENTS (DATA) |
|---|---|---|---|
| 1 | 2006/12/01 11:50:00 | AABBDD | X'22222222' |
| 2 | 2006/12/01 11:55:12 | CCHHRR | X'33333333' |
| 3 | 2006/12/01 12:00:10 | AABBFF | X'44444444' |
| 4 | 2006/12/01 12:01:00 | AABBDD | X'55555555' |

FIG. 7

309 DATA COPY INDICATION INFORMATION TABLE

| # | ITEM | VALUE |
|---|---|---|
| 1 | STORAGE NAME | STORAGE A |
| 2 | DATA COPY SPECIFIED TIME | 2006/12/01 12:00:00 |
| 3 | RESPONSE TO ABNORMALITY | CANCEL |
| 4 | SETTING TIME AT RESET | 6 HOURS |
| 5 | DATA REFLECTION WAIT TIME | 10 MINUTES |
| 6 | CRITICAL WAIT TIME | 30 MINUTES |
| 7 | LATEST UPDATE TIME | 2006/12/01 09:13:00 |
| 8 | DATA COPY STATUS | PREPARATION END STATE |
| 9 | REMOTE COPY STATUS | NORMAL |
| 10 | PATH STATUS | ABNORMAL |

FIG. 8

407 PRIMARY DATA COPY MANAGEMENT TABLE

| # | ITEM | VALUE |
|---|---|---|
| 1 | REMOTE COPY STATUS | NORMAL |
| 2 | PATH STATUS | ABNORMAL |

FIG. 9

508 SECONDARY DATA COPY MANAGEMENT TABLE

| # | ITEM | VALUE |
|---|---|---|
| 1 | SPECIFIED TIME | 2006/12/01 12:00:00 |
| 2 | DATA COPY STATUS | PREPARATION END STATE |
| 3 | DATA REFLECTION WAIT TIME | 10 MINUTES |
| 4 | CRITICAL WAIT TIME | 30 MINUTES |
| 5 | REMOTE COPY STATUS | NORMAL |
| 6 | LATEST DATA TIME | 2006/12/01 09:13:00 |
| 7 | END PREPARATION TIME | 2006/12/01 12:01:30 |

FIG. 10A

509 JOURNAL INFORMATION MANAGEMENT TABLE

| POINTER | DATA REFLECTION |
|---|---|
| 1 | REFLECTED |
| 2 | REFLECTED |
| 3 | NOT REFLECTED |
| ⋮ | ⋮ |

FIG. 10B

SJVOL

| # | UPDATE TIME | UPDATE LOCATION | DATA |
|---|---|---|---|
| 1 | 2006/12/01 11:50:00 | AABBDD | X'22222222' |
| 2 | 2006/12/01 11:55:12 | AABBDD | X'33333333' |
| 3 | 2006/12/01 12:01:00 | AABBDD | X'55555555' |
| ⋮ | ⋮ | ⋮ | ⋮ |

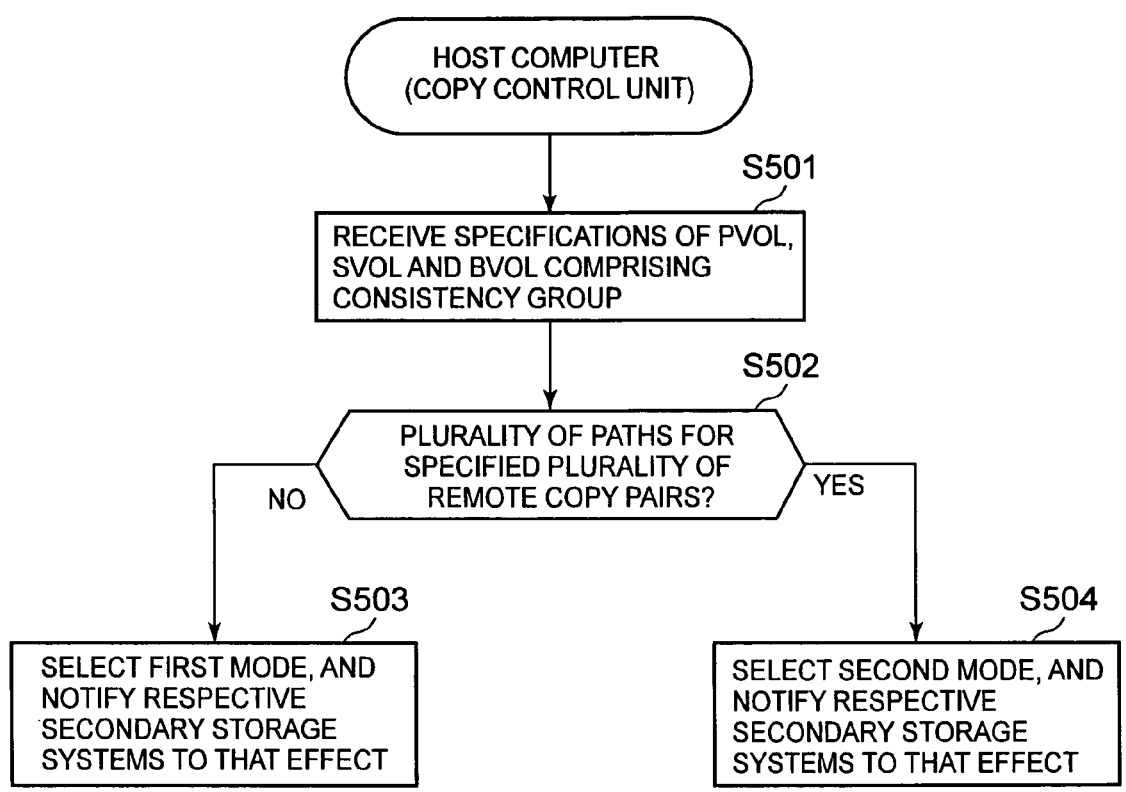

BACKUP CONTROL METHOD FOR ACQUIRING PLURALITY OF BACKUPS IN ONE OR MORE SECONDARY STORAGE SYSTEMS

CROSS-REFERENCE TO PRIOR APPLICATION

This application relates to and claims the benefit of priority from Japanese Patent Application number 2007-43295, filed on Feb. 23, 2007, the entire disclosure of which is incorporated herein by reference.

BACKGROUND

The present invention relates to technology for acquiring a backup in a storage system, which is the transfer destination of a journal used for remote copying.

Technology related to remote copying from a primary storage system to a secondary storage system is known. As one method of remote copying, there is a method that uses a journal, which is information related to the update history of a primary logical volume (hereinafter, PVOL). More specifically, for example, when data is written to a PVOL, a primary storage system prepares a journal comprising this data, and transfers this journal to a secondary storage system. The secondary storage system writes the data inside this journal to a secondary logical volume (hereinafter, SVOL).

In a secondary storage system, it can be desirable to acquire a data backup at a specified time status. For example, the technology disclosed in Japanese Patent Laid-open No. 2006-155676 (hereinafter, Literature 1) is related to acquiring a data backup at a specified time status.

Further, for example, the technology disclosed in Japanese Patent Laid-open No. 2005-18738 (hereinafter, Literature 2) is related to restoring data at an arbitrary point in time using a journal.

It is supposed that there are one or more secondary storage systems having a plurality of SVOLs, which constitute a plurality of volume pairs respectively with a plurality of PVOLs that exist in one or more primary storage systems, and that a data backup is acquired at a specified time for each volume pair in these one or more secondary storage systems.

In this case, in Literature 1, if the acquisition of a backup fails in at least one of the volume pairs, a backup is acquired for the other volume pair. Thus, consistency cannot be maintained for a plurality of backups in one or more secondary storage systems.

According to the technology disclosed in Literature 2, it is possible to restore data at a specified time by sequentially writing the data in a plurality of journals, which were prepared from a certain point in time until a specified time relative to a snapshot of the certain point in time, to this snapshot. However, there is the risk that the more numerous the number of journals from a certain point in time until a specified time, the longer it will take for restoration.

SUMMARY

Therefore, an object of the present invention is to make it possible to maintain consistency of a plurality of backups acquired in one or more secondary storage systems for a plurality of volume pairs, and to quickly restore data at a specified time.

Other objects of the present invention should become clear from the following description.

Each of one or more secondary storage systems comprises a logical volume for backup use. A controller sets a specified time, which is a time specifying a time in the future relative to the current time, in all of the one or more secondary storage systems. Upon detecting a journal, which comprises time information denoting a time in the future relative to the specified time, or upon learning that a journal, which comprises time information showing a time in the future relative to the specified time, is not stored in a primary storage system comprising a primary logical volume that constitutes a volume pair with its own secondary logical volume, each of the one or more secondary storage systems sets a backup preparation end state for the backup logical volume, and notifies the controller of information showing a preparation end state. When there are information reports showing preparation end states from all of the one or more secondary storage systems, the controller issues a backup command to all of the one or more secondary storage systems. The respective secondary storage systems, upon receiving this backup command, write data up to the specified time in the BVOL.

BRIEF DESCRIPTION OF THE DRAWINGS

FIG. 6 shows an example of the update data information table shown in FIG. 2;

FIG. 7 shows an example of the data copy indication information table shown in FIG. 3;

FIG. 8 shows an example of the primary data copy management table shown in FIG. 4;

FIG. 9 shows an example of the secondary data copy management table shown in FIG. 5;

FIG. 10A shows an example of the journal management information table shown in FIG. 5;

FIG. 10B shows an example of an SJVOL;

FIG. 35A shows an example of the flow of consistency group specification processing in a fifth embodiment of the present invention;

FIG. 35B shows an example of the constitution of a volume management table;

DETAILED DESCRIPTION OF THE PREFERRED EMBODIMENTS

Figure 1:
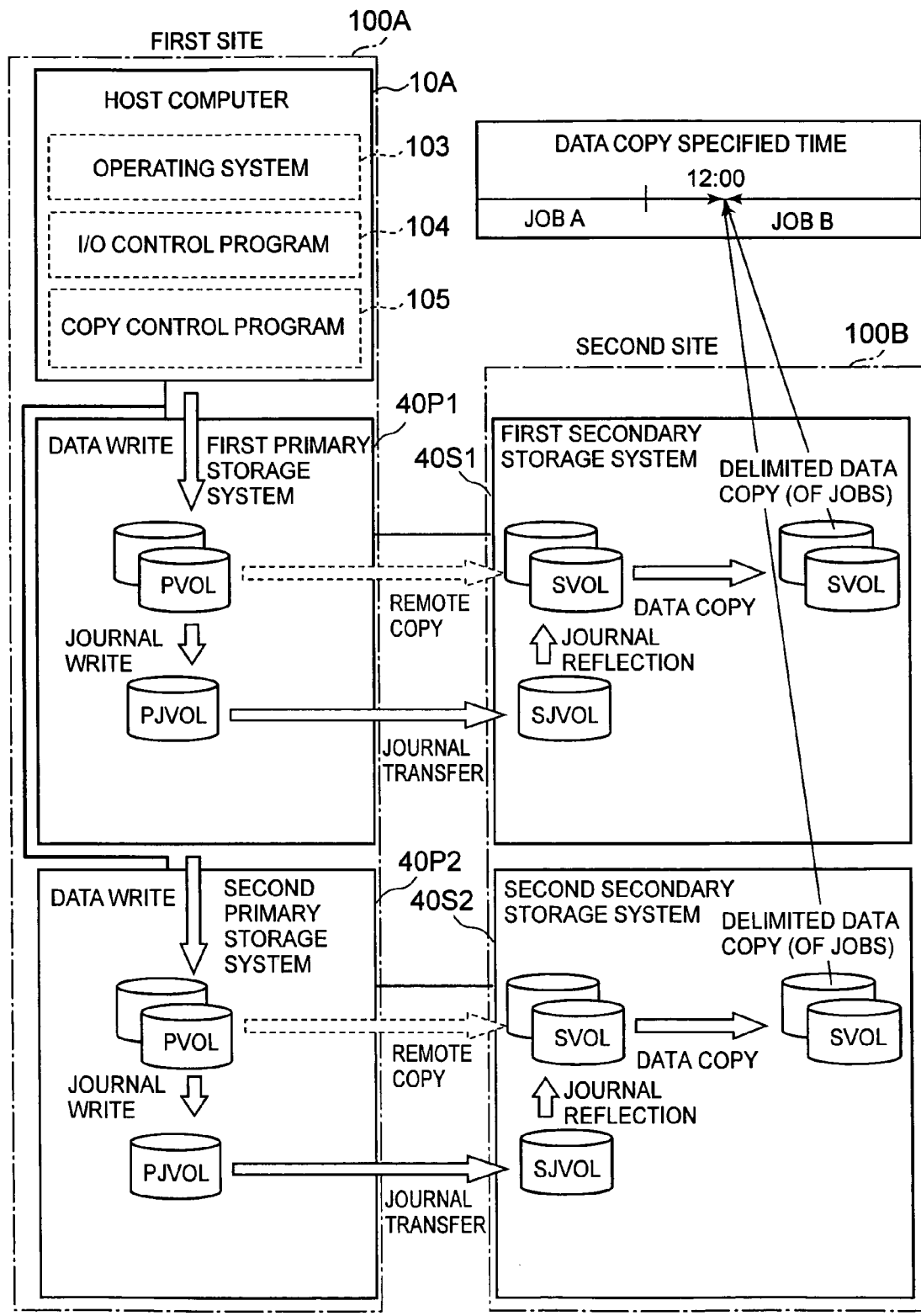
FIG. 1 shows an example of the constitution of a computer system related to a first embodiment of the present invention.

In a first embodiment of the present invention, one or more primary storage systems comprising a plurality of PVOLs is connected to one or more secondary storage systems comprising a plurality of SVOLs, which respectively constitute a plurality of volume pairs with the plurality of PVOLs, and there is a controller for these one or more secondary storage systems. The one or more secondary storage systems receive a journal comprising time information and data, which is written to a primary logical volume, for each of a plurality of volume pairs via a path that differs from the path over which a journal for another volume pair is transferred. More specifically, for example, at least one of one or more primary storage systems and one or more secondary storage systems are a plurality of storage systems. Or, for example, a different path (path between storage systems) is allocated to each of a plurality of volume pairs.

Each of one or more secondary storage systems can comprise a backup logical volume (hereinafter described as "BVOL"), a journal storage resource, a journal control unit, a time specification receiving unit, a status management unit, and a backup execution unit. The journal control unit can write a received journal to the journal storage resource, and can write to an SVOL data inside a journal, which is stored in the journal storage resource, but has not been written to an SVOL. The time specification receiving unit can receive from the controller a specification of a specified time, which is a time specifying a time in the future relative to the current time. The status management unit, upon detecting a journal (for example, when this journal is written to the journal storage resource), which comprises time information denoting a time in the future of a specified time, or upon learning that a journal, which comprises time information denoting a time in the future of a specified time, is not stored in a primary storage system, which comprises a PVOL constituting a volume pair with the above-mentioned SVOL (hereinafter, referred to as "when a journal up to a specified time has been established"), can set the BVOL to the backup preparation end state, and can send information showing the preparation end state to the controller. The backup execution unit, upon receiving a backup command from the controller, can execute backup processing for writing data, which is in a journal of up to a specified time, in the BVOL.

The controller can comprise a time specification unit and a backup control unit. The time specification unit can specify a specified time for all of the one or more secondary storage systems. The backup control unit, upon receiving information showing a preparation end state from all of the one or more secondary storage systems, can send a backup command to all of these one or more secondary storage systems.

Here, "a time in the future of a specified time" can be treated as a time that exceeds a specified time by a prescribed time. The prescribed time can be an extremely short time, or it can be a length of time of several seconds or several minutes.

Further, "data up to a specified time", for example, is data comprised in each of a plurality of journals, which comprises time information showing a time, which belongs to a time period from a certain time in the past of a specified time until the specified time.

Further, the journal storage resource can be one storage area (for example, a logical volume), or it can be a storage resource constituting a plurality of storage sub-spaces. In the case of the latter, for example, the data in a journal is stored in a first storage sub-area (for example, a logical volume), time information inside a journal is stored in a second storage sub-area (for example, memory), and the time information and data can be linked to a pointer or the like.

In one embodiment, the journal control unit, under prescribed circumstances (for example, when a journal up to a specified time has been established), can be constituted so as to write to an SVOL data, which is in a journal comprising time information showing a time of prior to or contemporaneous a specified time, and not write to an SVOL data, which is in a journal comprising time information showing a time in the future of a specified time. The backup execution unit, upon receiving a backup command, can execute a data copy from an SVOL to a BVOL (that is, backup processing).

In one embodiment, for example, a pair state of a volume pair constituting an SVOL (copy source) and a BVOL (copy destination) can include a split state (state in which the BVOL is not updated even if the SVOL is updated), the above-described preparation end state, and a copy state (a state in which the BVOL is also updated when the SVOL is updated). In this case, the status management unit can set the pair state to the split state prior to a journal up to a specified time being established, can set the pair state to the preparation end state when a journal up to a specified time has been established, can set the pair state to the copy state when a backup command has been received, and can set the pair state to the split state once data copying has ended. The backup execution unit, in response to the pair state being changed from the preparation end state to the copy state, can execute a data copy (backup processing), and in response to the pair state being changed from the copy state to the split state, can write to the SVOL data, which is in a journal comprising time information denoting a time in the future of a specified time.

In one embodiment, the backup execution unit is constituted such that backup processing involves writing data, which is in a journal stored in the journal storage resource, to the BVOL from the journal storage resource. The backup execution unit, upon receiving a backup command, can write to the BVOL the data, which is in a journal from a time subsequent to a time, which denotes time information corresponding to a journal comprising data written at the end in the immediately previous backup process, up to a specified time.

In one embodiment, one BVOL can be set for one volume pair comprising a PVOL and a SVOL.

In one embodiment, the status management units of the respective secondary storage systems, upon detecting an abnormality related to a volume pair having an SVOL of this secondary storage system (for example, when the status of this volume pair, and/or the status if a path between storage systems utilized in transferring a journal for this volume pair is detected to be abnormal), can send information showing the abnormal state to the controller.

In one embodiment, the time specification unit, upon receiving information showing an abnormal state from at least one of the one or more secondary storage systems, can send a cancel command to all of the one or more secondary storage systems. The backup execution unit can cancel a preparation end state in response to receiving a cancel command from the controller.

In one embodiment, the journal control unit can write to an SVOL the data, which is in a journal of a time of prior to or contemporaneous the time prior to a fixed time from the current time. The time specification unit, upon receiving information showing an abnormal state from at least one of the one or more secondary storage systems, can acquire from the secondary storage system, which is the source of the information showing an abnormal state, time information corresponding to a journal having data that was recently written to an SVOL, and can specify a time denoting this time information as a specified time to all of the one or more secondary storage systems.

In one embodiment, the time specification unit, upon receiving information showing abnormal information from at least one of the one or more secondary storage systems, can specify a time in the future of a specified time as a new specified time to all of the one or more secondary storage systems.

In one embodiment, the time specification unit, if, after specifying a specified time to all of the one or more secondary storage systems, a prescribed type of information (for example, either information showing a preparation end state, or information showing an abnormal state) is not received from at least one of the one or more secondary storage systems despite a waiting period having elapsed, can send a prescribed type of command (for example, a cancel command) to all of the one or more secondary storage systems.

In one embodiment, the backup execution unit, upon not receiving a backup command from the controller despite the passage of first waiting time subsequent to information showing that a preparation end state was sent, can cancel the preparation end state, or can execute backup processing for either the BVOL or another BVOL.

In one embodiment, the time specification unit is constituted such that, upon not receiving a prescribed type of information from at least one of the one or more secondary storage systems despite the passage of a second waiting period subsequent to specifying a specified time to all of the one or more secondary storage systems, sends a prescribed type of command to all of the one or more secondary storage systems. In this embodiment, the first waiting time is longer than the second waiting time.

The controller can further comprise a specification receiving unit, a determination unit and a notification unit. The specification receiving unit can receive one or more volume pair specifications as a range for maintaining consistency (for example, as a consistency group, which will be explained hereinbelow). The determination unit can make a determination as to whether or not different paths are used in journal transfer for one or more specified volume pairs (for example, whether or not at least one of the one or more primary storage systems and one or more secondary storage systems are a plurality of storage systems. The notification unit can notify a secondary storage system, which is related to the above-mentioned one or more specified volume pairs of the one or more secondary storage systems, of information related to the results of the above-mentioned determination (for example, information showing the determination results themselves, or information showing the results of processing carried out in accordance with the results of that determination). In this embodiment, the status management units of the respective secondary storage systems are constituted so as to set a preparation end state when the received information relates to affirmative determination results, execute backup processing upon receiving a backup command thereafter, not set a preparation end state when the received information relates to negative determination results, and execute backup processing without setting a preparation end state or receiving the above-mentioned backup command.

The above-mentioned controller can include any one of one or more higher-level devices for updating a plurality of PVOLs; any one of one or more primary storage systems; any one of one or more secondary storage systems; any one of one or more higher-level devices connected to one or more secondary storage systems; and any one of the management computers that manage the one or more secondary storage systems. The higher-level device can be a host computer or a storage system.

Further, the respective parts described hereinabove (journal control unit, time specification receiving unit, status management unit, backup execution unit, time specification unit, backup control unit, and so forth) can be realized by hardware (for example, circuitry), a computer program, or a combination thereof (for example, realizing a portion with a computer program, and realizing the remainder with hardware). The respective computer programs can be read in from a storage resource (for example, a memory) of a computer machine. These respective computer programs can be installed via a recording medium, such as a CD-ROM or DVD (Digital Versatile Disk), or can be downloaded via a communications network, such as the Internet or a LAN.

A number of embodiments will be explained in detail below. Furthermore, in the following explanation, it is supposed that there are two primary storage systems and two secondary storage systems.

First Embodiment

FIG. 1 shows an example of the constitution of a computer system related to a first embodiment of the present invention.

There is a first site 100A and a second site 100B.

The first site 100A has a first primary storage system 40P1 and a second primary storage system 40P2, and one or more (for example, one) host computer 10A, which is connected to the first and second primary storage systems 40P1 and 40P2. Meanwhile, the second site 100B has a first secondary storage system 40S1, which is connected to the first primary storage system 40P1, and a second secondary storage system 40S2, which is connected to the second primary storage system 40P2. The first site 100A and the second site 100B do not have to be separate, and could also be one site.

Hereinafter, when the primary storage system can be either one of the one or more primary storage systems, this primary storage system will be described as "primary storage system 40P". Similarly, when the secondary storage system can be either one of the one or more secondary storage systems, this secondary storage system will be described as "secondary storage system 40S".

The first and second primary storage systems 40P1 and 40P2 each have a primary logical volume (PVOL), and a logical volume for a primary journal (hereinafter, PJVOL). The first and second secondary storage systems 40S1 and 40S2 each have a secondary logical volume (SVOL), which constitutes a volume pair with a PVOL, a logical volume for a secondary journal (hereinafter, SJVOL), and a backup logical volume (hereinafter, BVOL). Hereinafter, of the same types of components that exist in the storage systems described above, a component that exists in a first storage system may be designated as a first component (for example, a PVOL inside the first primary storage system may be designated as the "first PVOL"), and a component that exists in a second storage system may be designated as a second component (for example, a PVOL inside the second primary storage system may be designated as the "second PVOL"). Further, a volume pair of a PVOL and a SVOL may be called a "remote copy pair", and the status of a remote copy pair may be called the "remote copy status".

The host computer 10A can have an operating system (hereinafter, OS) 103, I/O (input/output) control program 104, and a copy control program 105. Hereinafter, when a computer program is the subject, it is supposed that processing is actually carried out by the CPU, which executes this computer program. The I/O control program 104 can be an application program for executing a prescribed job, and can indicate the sending of a write command specifying the first PVOL or the second PVOL to the OS 103 as an input/output request. The copy control program 105 can indicate an asynchronous remote copy, which utilizes a journal, or a data copy (backup) of data of a specified time to the OS 103 as an input/output request. The OS 103 can process an input/output request from the I/O control program 104 and the copy control program 105. The OS 103 can be a mainframe system OS.

Thus, the first and second primary storage systems 40P1 and 40P2 and the host computer 10A, for example, can carry out communications as mainframe communications in accordance with ESCON (Enterprise Systems Connection) (registered trademark), or FICON (Fibre Connection) (registered trademark). Furthermore, the OS 103 can also be an open system OS. In this case, the first and second primary storage systems 40P1 and 40P2 and the host computer 10A, for example, can carry out communications as open system communications in accordance with iSCSI (Internet Small Computer System Interface), or Fibre Channel.

An asynchronous remote copy, which uses a journal, can be executed from the primary storage system 40P to the secondary storage system 40S. This remote copy will be explained giving as a typical example the first primary storage system 40P1 and the first secondary storage system 40S1. A write command, which specifies the first PVOL is sent to the first primary storage system 40P1 from the I/O control program 104 of the host computer 10A via the OS 103. Information (hereinafter, update time information) showing the time when a write command is sent (hereinafter, update time) is included in this write command by the OS 103. The first primary storage system 40P1 writes to the first PVOL the write-targeted data that conforms to this write command, and, creates of journal comprising this write-targeted data, the update time information included in the write command, and update location information, which is information showing the location of the write-destination of the write-targeted data (for example, a logical unit number of the first PVOL and a logical block address in the first PVOL), and writes this journal to the first PJVOL. The first primary storage system 40P1, either actively or in response to a request from the first secondary storage system 40S1, reads a journal, which has not been sent to the first secondary storage system 40S1, from the first PJVOL, and transfers this journal to the first secondary storage system 40S1. The first secondary storage system 40S1 writes the received journal to the first SJVOL. The first secondary storage system 40S1 reflects one or more unreflected journals, which are stored in the first SJVOL, in the first SVOL in the order same were updated in the first PVOL (for example, in order from the journal for which the update time shown in the update time information is the furthest in the past). Here, reflecting a journal in the SVOL signifies writing the data inside a journal to an update area denoted by the update location information in the journal (for example, a block corresponding to a logical block address in the SVOL). As a result of the above sequence of processes, data is remote copied in asynchronous form from the first PVOL to the first SVOL as shown by the broken-line arrow in FIG. 1. Furthermore, in an asynchronous remote copy, the primary storage system, which receives the write command from the host computer 10A, notifies the host computer 10A of write-end, not upon receiving a notification from the secondary storage system that data was written to the SVOL, but rather at the point in time when the write-targeted data conforming to the write command was written either to its own cache memory or to the PVOL, and thereafter, processing for transferring the journal to the secondary storage system is carried out. Further, remote copy is not limited to the asynchronous form, and can also be carried out in the synchronous form. For example, the primary storage system 40P1 can send a journal to the secondary storage system 40S1 as soon as it is created, and the secondary storage system 40S1 can reflect this journal in the SVOL right away.

The host computer 10A sends a first backup command (hereinafter, specified time data copy acquisition indication) comprising a data copy specification time (hereinafter, may be called simply "specified time"), which specifies the time at which a data copy of data in the PVOL is acquired to all the secondary storage systems 40S1 and 40S2. The processing carried out by the secondary storage systems 40S1 and 40S2 will be explained hereinbelow using the first secondary storage system 40S1 as a typical example. The pair state (hereinafter, may be called "data copy state") of a volume pair of the first SVOL and the first BVOL (hereinafter, data copy pair) is set to the split state. The first secondary storage system 40S1 transitions the pair state of the first data copy pair to the preparation end state so that a journal, which comprises update time information showing a time in the future of a specified time, is not reflected to the first SVOL at the point when a journal up to a specified time is established, and sends information showing the preparation end state to the host computer 10A by way of (or not by way of) the first primary storage system 40P1. The point when a journal up to a specified time is established is either the point in time at which the first secondary storage system 40S1 detects a journal comprising update time information showing a time in the future of a specified time, or the point in time at which the first secondary storage system 40S1 learns, by issuing a query to the first primary storage system 40P1, that a journal comprising update time information showing a time in the future of a specified time is not stored in the first primary storage system 40P1 comprising the first PVOL, which constitutes a remote copy pair with the first SVOL. The host computer 10A, upon receiving information showing a preparation end state from all the secondary storage systems 40S1 and 40S2, sends to all the secondary storage systems 40S1 and 40S2 a second backup command (hereinafter, specified time data copy command) by way of (or not by way of) the respective first and second primary storage systems 40P1 and 40P2. After sending information showing a preparation end state to the host computer 10A, the first secondary storage system 40S1, upon receiving a specified time data copy command from the host computer 10A by way of (or not by way of) the first primary storage system 40P1, transitions the pair state of the first data copy pair from the preparation end state to the copy state in response to this specified time data copy command, and accordingly, copies the data inside the first SVOL to the first BVOL. If an unreflected journal comprising update time information showing a time of prior to or contemporaneous a specified time is reflected in the first SVOL during the copy state (that is, if new data is written to the first SVOL), the first secondary storage system 40S1 may copy this data, which was newly written to the first SVOL, to the first, BVOL. After end copy (after copying of data up to a specified time to the first BVOL is finished), the first secondary storage system 40S1 transitions the pair state of the first data copy pair from the preparation end state to the split state, and thereafter, commences reflecting the journal, which comprises update time information showing a time in the future of the specified time, in the first SVOL.

The above processing is carried out the same way by the second secondary storage system 40S2 as well. According to the above processing, upon receiving information showing a preparation end state from all of the secondary storage systems 40S1 and 40S2, the host computer 10A sends a specified time data copy command to all of the secondary storage systems 40S1 and 40S2, and accordingly, the data copy pair is transitioned to the copy state in all of the secondary storage systems 40S1 and 40S2, and copying is carried out from the SVOL to the BVOL. In other words, when information showing a preparation end state is not received from at least one secondary storage system 40S1 and/or 40S2, the host computer 10A does not send a data copy command to all of the secondary storage systems 40S1 and 40S2. Consequently, it is possible to maintain the consistency of a plurality of BVOLs that respectively exist in the plurality of secondary storage systems 40S1 and 40S2. Further, since the data inside a BVOL is data of a specified time, this BVOL can be used when restoring data of a specified time, enabling rapid restoration.

Furthermore, in the above explanation, if there is an unreflected journal, which comprises update time information showing a time prior to or contemporaneous a specified time, at the point when a journal up to the specified time is established, the first secondary storage system 40S1 can transition the pair state of the first data copy pair to the preparation end state after finishing the reflection of this journal to the first SVOL.

The first embodiment will be explained in more detail hereinbelow.

Figure 33:
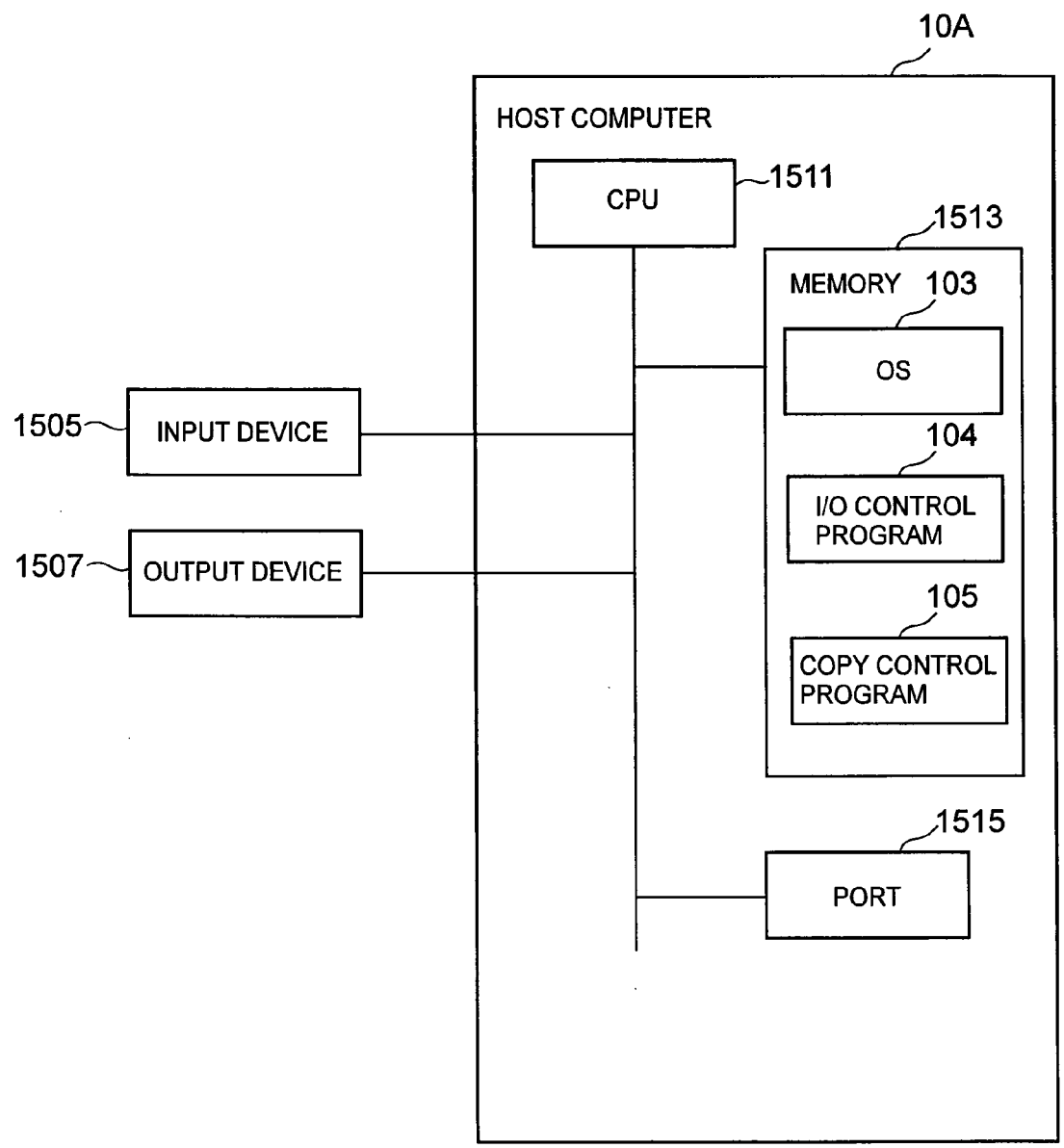
FIG. 33 shows an example of the constitution of a host computer.

FIG. 33 shows an example of the constitution of the host computer 10A.

The host computer 10A is a kind of computer, and comprises a CPU 1511, a memory 1513 (another type of storage resource can also be used), a port 1515 (a port for communicating with the first and second primary storage systems 40P1 and 40P2), an input device 1505 (for example, a keyboard or a mouse), and an output device 1507 (for example, a display device). The memory 1513 stores the above-described OS 103, I/O control program 104 and copy control program 105 as computer programs. These computer programs are executed by the CPU 1511.

Figure 34A:
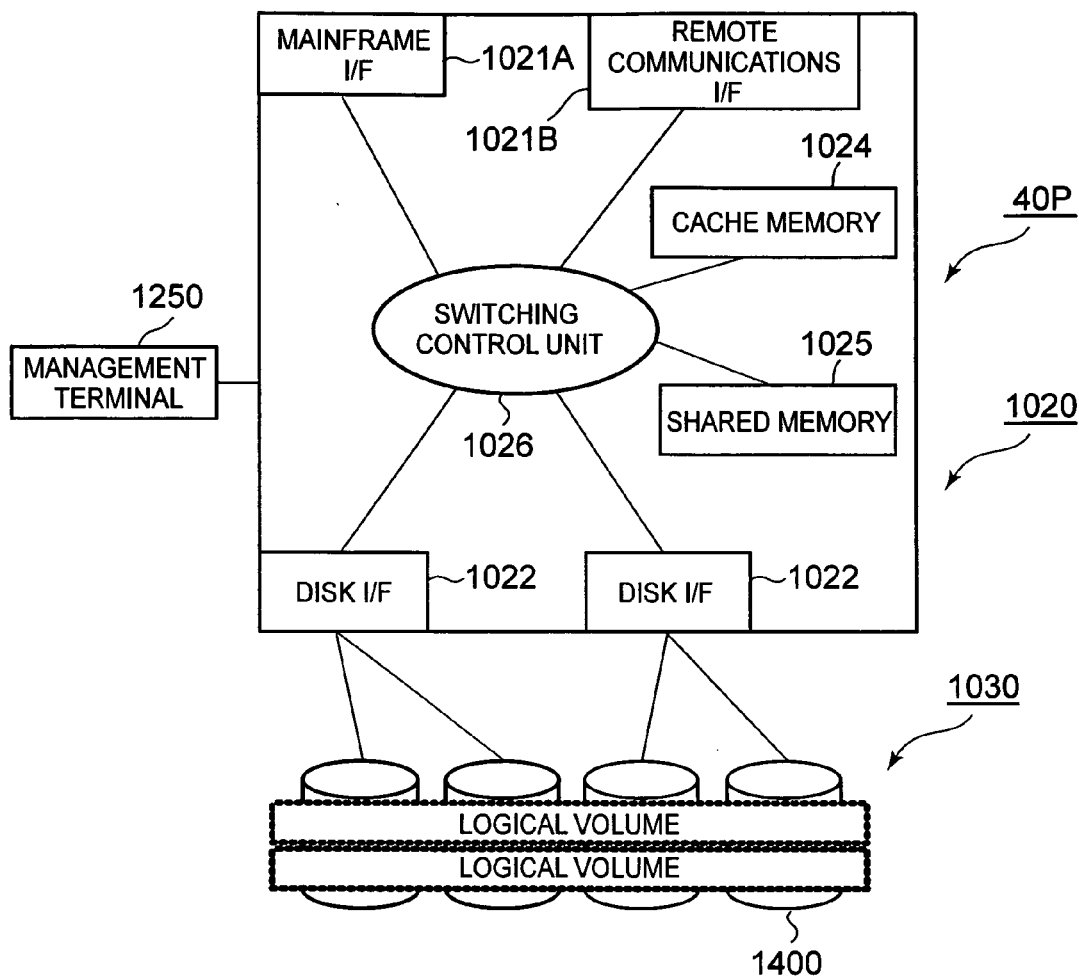
FIG. 34A shows an example of the constitution of a primary storage system.

FIG. 34A shows an example of the constitution of a primary storage system.

The primary storage system 40P shown in this figure is at least one of a first and second primary storage systems 40P1 and 40P2.

The primary storage system 40P, for example, can be a RAID (Redundant Array of Independent (or Inexpensive) Disks) system comprising a large number of disks 1400 arranged in an array.

The primary storage system 40P can be broadly divided into a controller unit 1020 and a disk unit 1030.

The controller unit 1020, for example, comprises a plurality of interface control devices (hereinafter, I/F), a cache memory 1024, a shared memory 1025, and a switching controller 1026. The plurality of interface control devices include a mainframe host I/F (hereinafter, mainframe I/F) 1021A, an I/F for other storage systems (hereinafter, remote communications I/F) 1021B, and an I/F for the disks 1400 (hereinafter, disk I/F) 1022. A management terminal 1250 for managing the primary storage system 40P can be connected to the controller unit 1020.

Figure 34B:
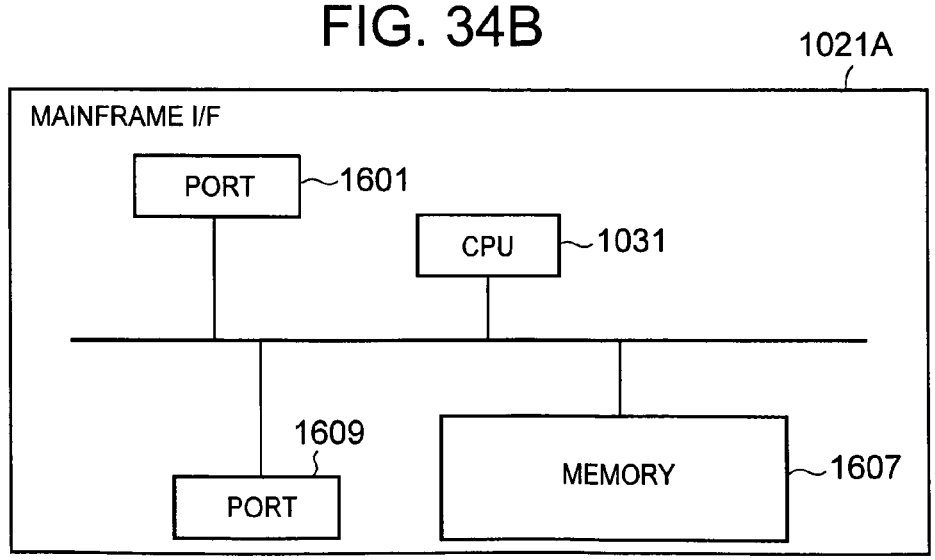
FIG. 34B shows an example of the constitution of a mainframe I/F.

The respective I/Fs are devices for controlling communications with other entities, and can be constituted from substantially the same hardware. FIG. 34B shows an example of the constitution of a mainframe I/F 1021A. The mainframe I/F 1021A comprises a port 1601 for communicating with the host computer 10A, a port 1609, which is connected to the switching controller 1026, a memory 1607, and a CPU 1603.

The cache memory 1024, for example, is either a volatile or a nonvolatile memory, and can temporarily store data received from the host computer 10A, and data read out from a disk 1400. The shared memory 1025, for example, is a volatile or nonvolatile memory, and stores information (hereinafter, a control data group) related to the control of the primary storage system 40P. For example, the shared memory 1025 and the cache memory 1024 do not have to be separate memories, and a shared memory area and a cache memory area can be provided in one memory instead.

The switching controller 1026 is a device for interconnecting the I/Fs 1021A, 1021B and 1022, the cache memory 1024 and the shared memory 1025, and, for example, can be constituted as a highspeed bus, like an ultra-highspeed crossbar switch or the like for carrying out data transmissions via highspeed switching operations.

The disk unit 1030 comprises a plurality of disks 1400 arranged in an array. The disks 1400 can be disk-type storage devices, such as hard disks, flexible disks, and optical disks. Other types of storage devices can be used instead of disks 1400, such as, for example, magnetic tape, and semiconductor memory (for example, flash memory). A logical volume is provided on a storage area of one or more disks 1400 (for example, no less than two disks 1400 constituting a RAID configuration). A logical volume inside the primary storage system 40P is a PVOL or a PJVOL. A logical volume is not limited to a disk 1400, and a storage area in another type of storage resource, such as the cache memory 1024, for example, can also be used.

At least one of the secondary storage systems 40S1 and 40S2 can be constituted as shown in FIG. 34A. Further, at least one controller unit 1020 of the storage systems 40P1, 40P2, 40S1, and 40S2, for example, can be a circuit board of a simpler constitution than the constitution described in FIG. 34A, comprising a CPU, a memory, and a communication port. In this case, the CPU can execute the processing carried out by the plurality of I/Fs.

Figure 2:
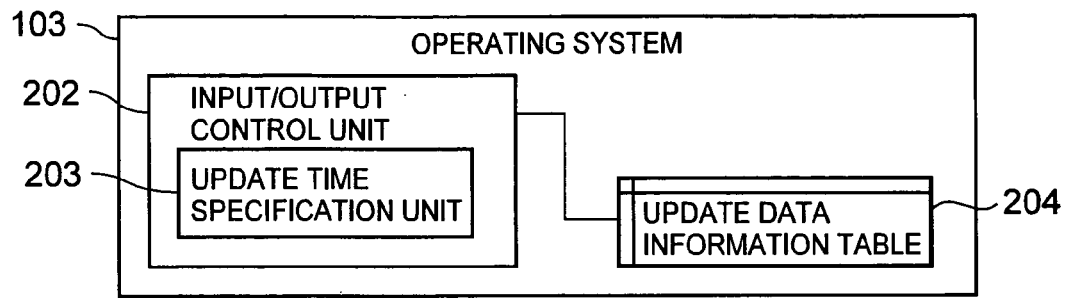
FIG. 2 represents the OS inside a host computer.

FIG. 2 shows the OS 103 inside the host computer 10A.

The OS 103 has an input/output control unit 202, and manages an update data information table 204. The input/output control unit 202 has an update time setting unit 203 for setting an update time for write-targeted data in response to receiving a write command send request (update request) from the I/O control program 104 to the PVOL.

Figure 3:
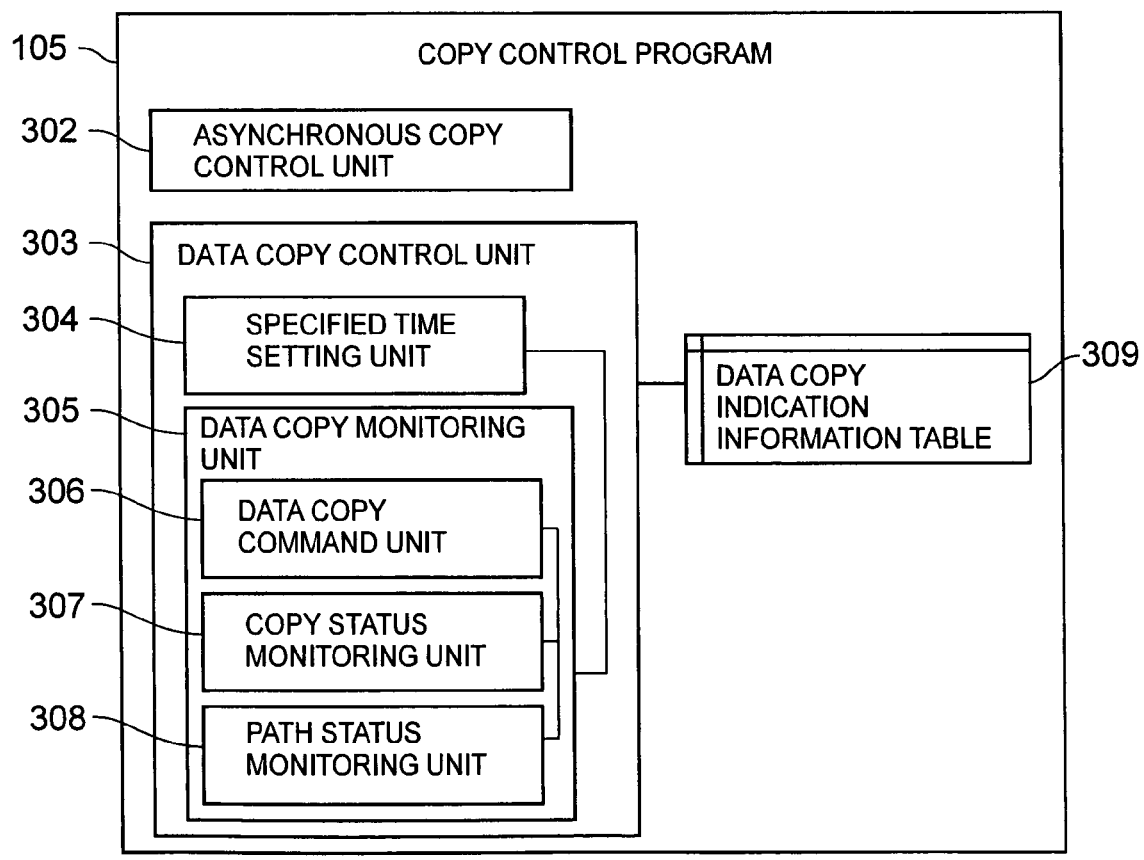
FIG. 3 shows an example of the constitution of a primary storage system.

FIG. 3 shows the copy control program 104 inside the host computer 10A.

The copy control program 104 has an asynchronous copy control unit 302 for controlling an asynchronous remote copy, and a data copy control unit 303 for controlling data copy in the respective secondary storage systems 40S, and manages a data copy indication information table 309. The data copy control unit 303 comprises a specified time setting unit 304 for setting a specified time for the respective secondary storage systems 40S, and a data copy monitoring unit 305 for carrying out monitoring related to the acquisition of a data copy. The data copy monitoring unit 305 has a data copy command unit 306 for issuing a data copy command, a copy status monitoring unit 307 for monitoring a remote copy status and a data copy status, and a path status monitoring unit 308 for monitoring the status of a path connecting a primary storage system 40P to a secondary storage system 40S.

Figure 4:
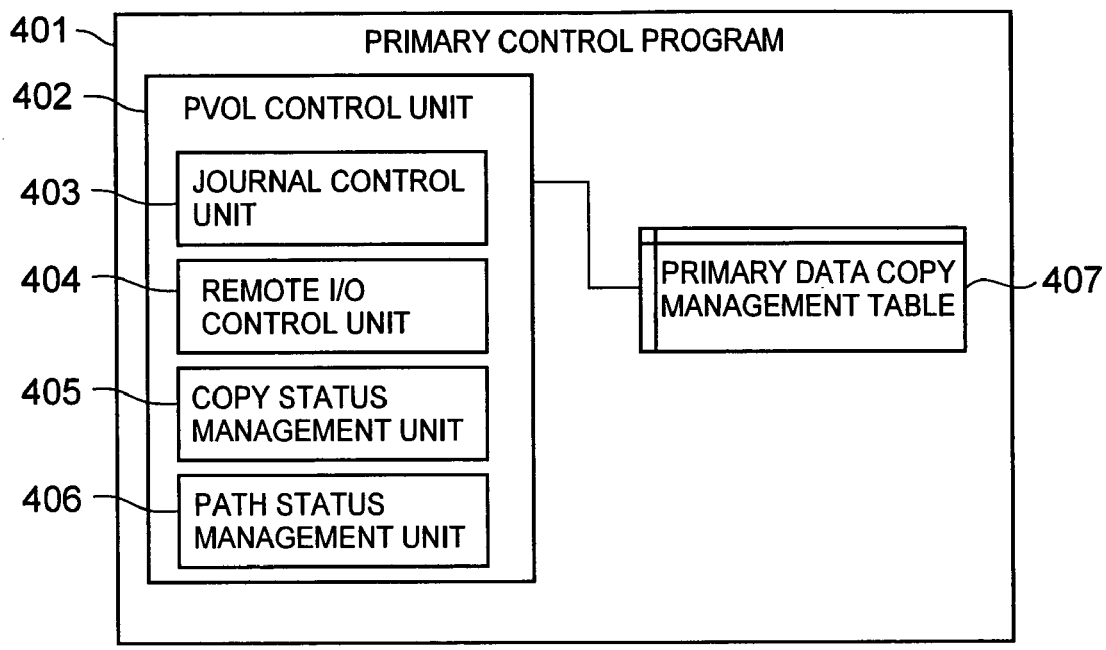
FIG. 4 shows a primary control program, which is one of the computer programs executed by the primary storage system.

FIG. 4 shows a primary control program, which is one of the computer programs executed by a primary storage system 40P.

The primary control program 401, for example, is executed by the mainframe I/F 1021A. The primary control program 401 has a PVOL control unit 402, and manages a primary data copy management table 407. This table 407 can be stored in a memory of the mainframe I/F 1021A, and can also be stored in either the cache memory 1024 or the shared memory 1025. The PVOL control unit 402 has a journal control unit 403 for controlling the creation of a journal comprising data written to the PVOL, and the transfer of a journal to a secondary storage system 40S, a remote I/F control unit 404 for issuing a command from the host computer 10A to a secondary storage system 40S by way of a primary storage system 40P, a copy status managing unit 405 for managing a remote copy status, and a path status managing unit 406 for managing the status of a path between storage systems.

Figure 5:
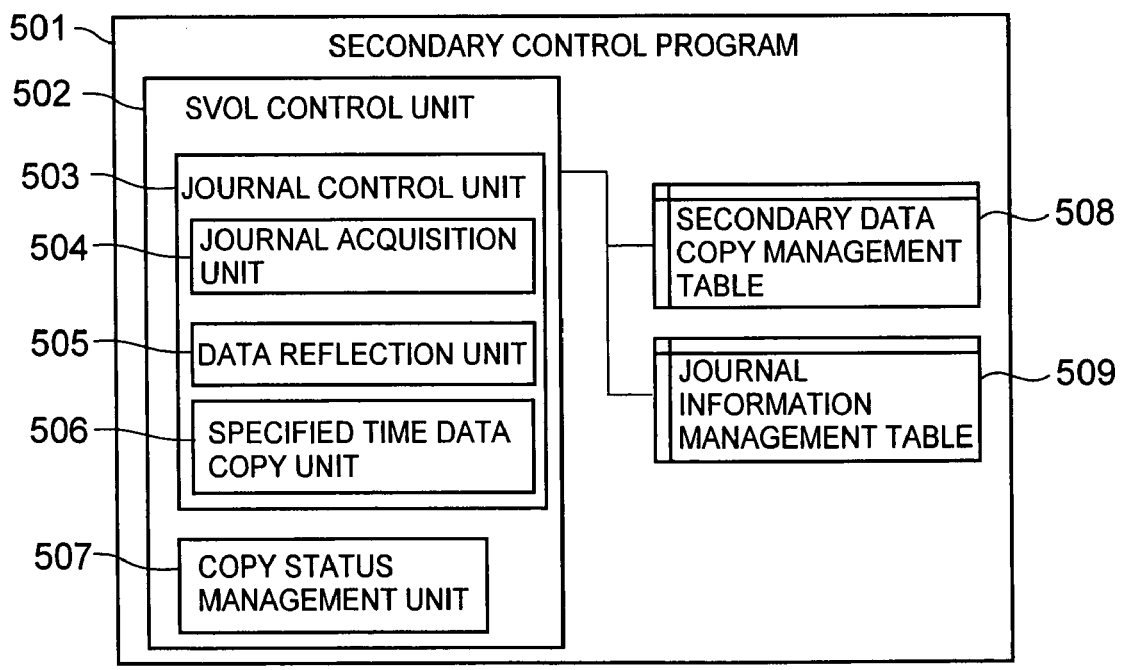
FIG. 5 shows a secondary control program, which is one of the computer programs executed by the secondary storage system.

FIG. 5 shows a secondary control program, which is one of the computer programs executed by a secondary storage system 40S.

The secondary control program 501, for example, is executed by the mainframe I/F 1021A. The secondary control program 501 has an SVOL control unit 502, and manages a secondary data copy management table 508 for managing the status of a data copy and the status of a remote copy, and a journal management information table 509 for managing the reflection state of a journal to the SVOL. These tables 508 and 509 can be stored in a memory of the mainframe I/F 1021A, and can also be stored in the cache memory 1024 or shared memory 1025. The SVOL control unit 502 has a journal control unit 503, and a copy status management unit 507 for managing the status of a data copy and the status of a remote copy. The journal control unit 503 has a journal acquisition unit 504 for acquiring a journal from the primary storage system 40P and writing same to the SJVOL, a data reflection unit 505 for reflecting a journal inside the SJVOL to the SVOL, and a specified time data copy unit 506 for executing a data copy for data of a specified time.

FIG. 6 shows an example of the update data information table 204 shown in FIG. 2.

Update data information inside a sent write command is included in one record of the update data information table 204 each time a write command is sent from the OS 103. Update data information constitutes update time information, update location information, and update contents (write-targeted data). An upper limit can be set for the number of records, and when the table 204 gets full, update data information can be written over the oldest record (the record for which the update time shown in the update time information is the furthest in the past).

FIG. 7 shows an example of the data copy indication information table 309 shown in FIG. 3.

The data copy indication information table 309 stores as a plurality of information elements a storage name, specified time information, a response to an abnormality, a setting time at reset, a data reflection wait time, a critical wait time, a latest update time, data copy status, remote copy status and path status. Hereinafter, the symbols " " will be used to denote an information element (item) in the table. Further, the symbols { } will be used to denote the value of an information element.

"Storage name" is an information element showing the name of the primary storage system 40P.

"Specified time" is an information element showing the time, which has been specified as the time for acquiring a data copy (not the actual time at the instant acquisition is carried out, but rather the time shown in the update time information inside a journal).

"Response to an abnormality" is an information element denoting the processing executed upon receiving information showing an abnormal state, and the value thereof, for example, can be one of four types, specifically, cancel, reset, acquire latest data, and report error.

"Setting time at reset" is an information element showing the length of time added to a currently set specified time to reset the specified time.

"Data reflection wait time" is an information element showing the minimal difference (length of time) between the time shown in the update time information inside a journal reflected in the SVOL and the current time. For example, the value of "data reflection wait time" is {10 minutes}, and when the current time is 12:00, a journal capable of being reflected in the SVOL is one that comprises update time information showing a time of 11:50 at the latest.

"Critical wait time" is an information element denoting the maximum waiting time until receipt of a backup command subsequent to reporting information showing a preparation end state for a data copy pair (that is, a volume pair constituting the SVOL and the BVOL).

"Latest update time" is an information element denoting the time shown in the update time information inside the journal most recently written to the SJVOL.

"Data copy status" is an information element denoting the pair state of a data copy pair, and, for example, the value thereof can be one of six types: standing by, preparation end state, processing, end, initial state, and failure.

"Remote copy status" is an information element denoting the pair state of a remote copy pair, and, for example, the value thereof can be one of three types: normal, abnormal, and initial state.

"Path status" is an information element denoting a state related to a path, which links the primary storage system to the secondary storage system (that is, a path between storage systems).

FIG. 8 shows an example of the primary data copy management table 407 of FIG. 4.

The plurality of information elements stored in the primary data copy management table 407 are remote copy status and path status.

"Remote copy status" is the pair state of a remote copy pair, and, for example, the value thereof can be one of three types: normal, abnormal, and initial state.

"Path status" is a state related to the path between storage systems, and, for example, the value thereof can be one of three types: normal, abnormal, and initial state.

FIG. 9 shows an example of the secondary data copy management table 508 on FIG. 5.

The plurality of information elements recorded in the secondary data copy management table 508 include specified time, data copy status, data reflection wait time, critical wait time, remote copy status, latest data time, and end preparation time. Specified time, data copy status, data reflection wait time, critical wait time, and remote copy status, respectively, are the same as the information elements explained by referring to FIG. 7.

"Latest data time" is an information element denoting the update time shown in the update time information inside the journal most recently reflected from the SJVOL to the SVOL.

"End preparation time" is an information element denoting the time at which information showing the preparation end state was sent.

FIG. 10A shows an example of the journal management information table 509 shown in FIG. 5. FIG. 10B shows an example of an SJVOL.

The journal management information table 509 stores "pointer" denoting a pointer to a journal written to the SJVOL, and "data reflection" (for example, a flag) denoting whether the journal has been reflected or not. Using the "pointer" value corresponding to the "data reflection" value {not reflected} makes it possible to acquire an unreflected journal (update time information, update location information, and information-comprising data) from the SJVOL.

Furthermore, only the data inside a journal can be written to the SJVOL, and the update time information and update location information can be written to the journal management information table 509. That is, there is no need for a journal to exist as one group in one storage resource, but rather the information elements constituting a journal can be distributed among a plurality of storage resources. Further, the same can be done for the primary storage systems 40P1 and 40P2, and the unsent journals and sent journals of a PJVOL can be differentiated.

The various processing flows carried out by this embodiment will be explained below.

Figure 11:
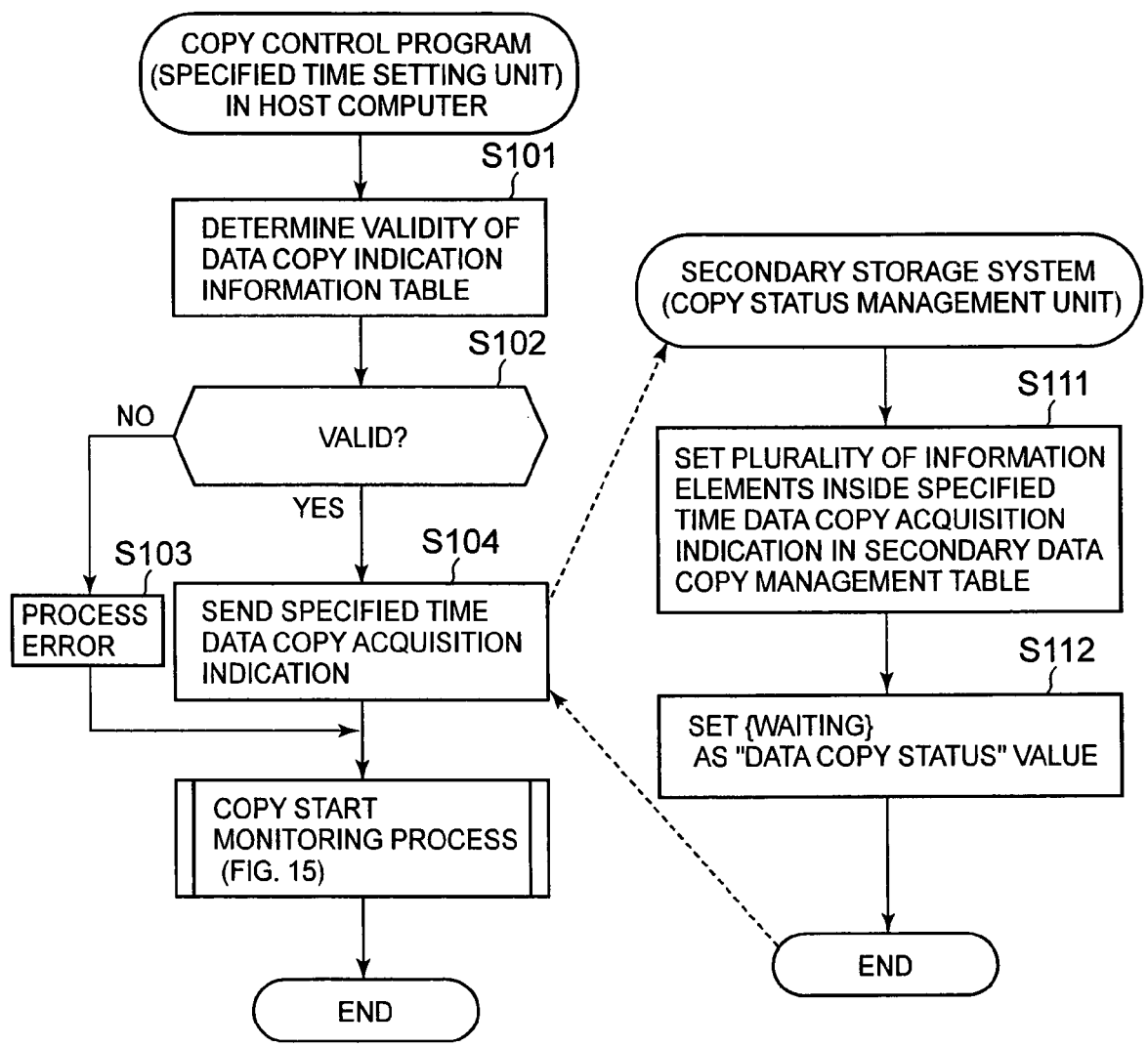
FIG. 11 shows an example of the flow of specified time data copy indication processing.

FIG. 11 shows an example of the processing flow for indicating a specified time data copy.

The specified time setting unit 304 determines the validity of the data copy indication information table 309 (S101). Here, for example, the determination result will be invalid if the value of the "specified time" is further in the past than a time that is older than the current time by the value of the "data reflection wait time". Further, for example, the determination result will also be invalid if the value of the "storage name" is an impossible value (for example, if the number of places exceeds a prescribed number).

If invalid is the determination result (S102: NO), the specified time setting unit 304 carries out error processing (for example, processing for displaying the fact that an inappropriate value is in the data copy indication information table 309) (S103), and thereafter, boots up the data copy monitoring unit 305, and executes start copy monitor processing (refer to FIGS. 18 through 20).

Conversely, if valid is the determination result (S102: YES), the specified time setting unit 304 creates a specified time data copy acquisition indication, and sends this specified time data copy acquisition indication to the plurality of secondary storage systems 40S1 and 40S2 via the plurality of primary storage systems 40P1 and 40P2, respectively. Of the values of the plurality of types of information elements recorded in the data copy indication information table 309, a specified time data copy acquisition indication, which has been created, comprises a "specified time" value, "data reflection wait time" value, "critical wait time" value, and "remote copy status" value. Further, the destination of the specified time data copy acquisition indication is the primary storage system specified from the value of the "storage name" recorded in the data copy indication information table 309. The specified time data copy acquisition indication is transferred to the secondary storage systems 40S1, 40S2 via these primary storage systems 40P1, 40P2. Furthermore, if one primary storage system is connected to a plurality of secondary storage systems, this one primary storage system can send the received specified time data copy acquisition indication to the plurality of secondary storage systems, or the secondary storage system name, which serves as the address of this acquisition indication, can be written to the specified time data copy acquisition indication.

In the respective secondary storage systems 40S1, 40S2 that receive the specified time data copy acquisition indication, the copy status management unit 507 sets in the secondary data copy management table 508 the "specified time" value, "data reflection wait time" value, "critical wait time" value, and "remote copy status" value that are inside this specified time data copy acquisition indication (S111). Further, the copy status management unit 507 sets {standing by} as the "data copy status" value in the secondary data copy management table 508 (S112). Then, the copy status management unit 507 sends a response related to specified time data copy acquisition indication to the host computer 10A via the primary storage systems 40P1, 40P2.

Figure 18:
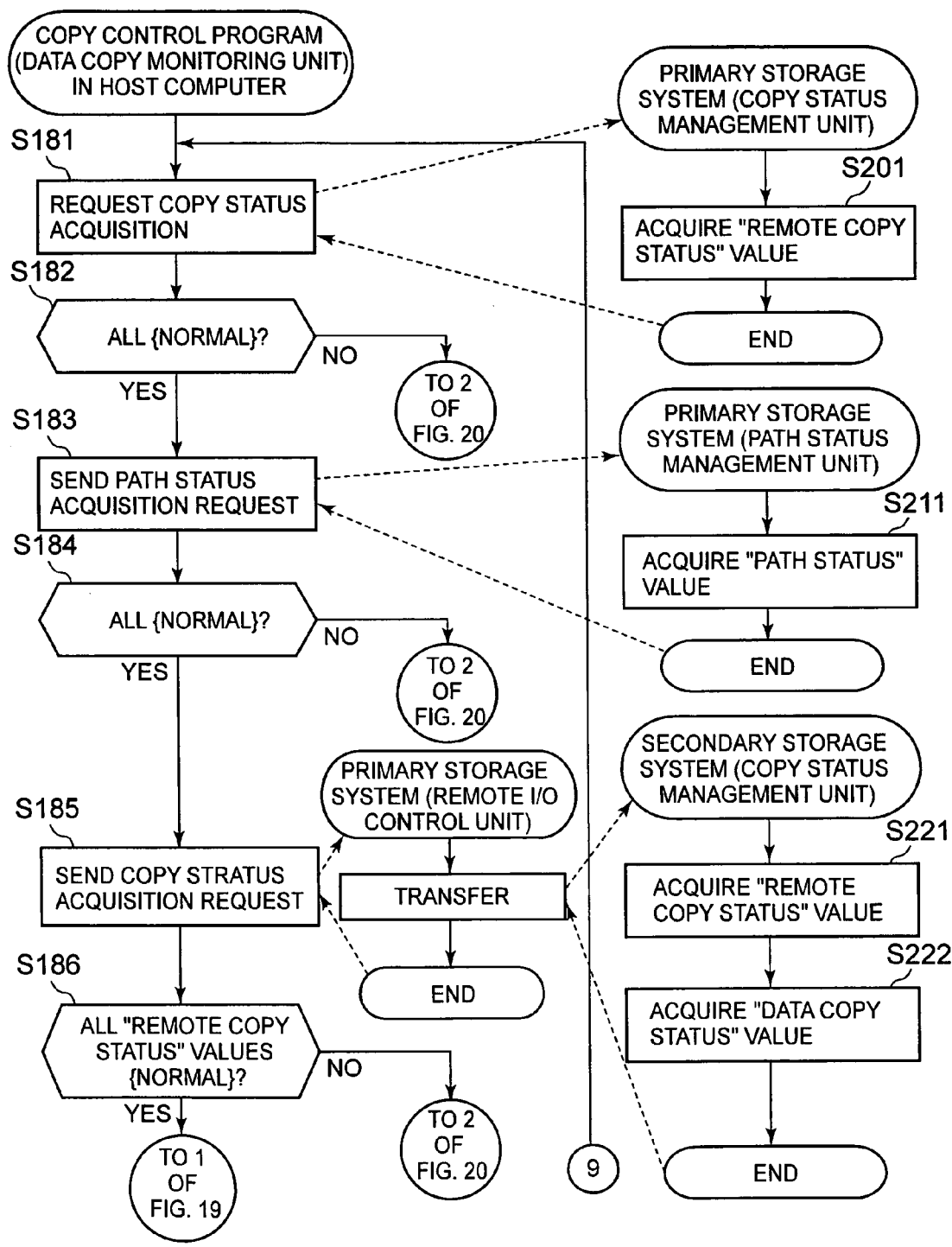
FIG. 18 shows the first part of an example of the flow of start copy monitoring processing.
Figure 19:
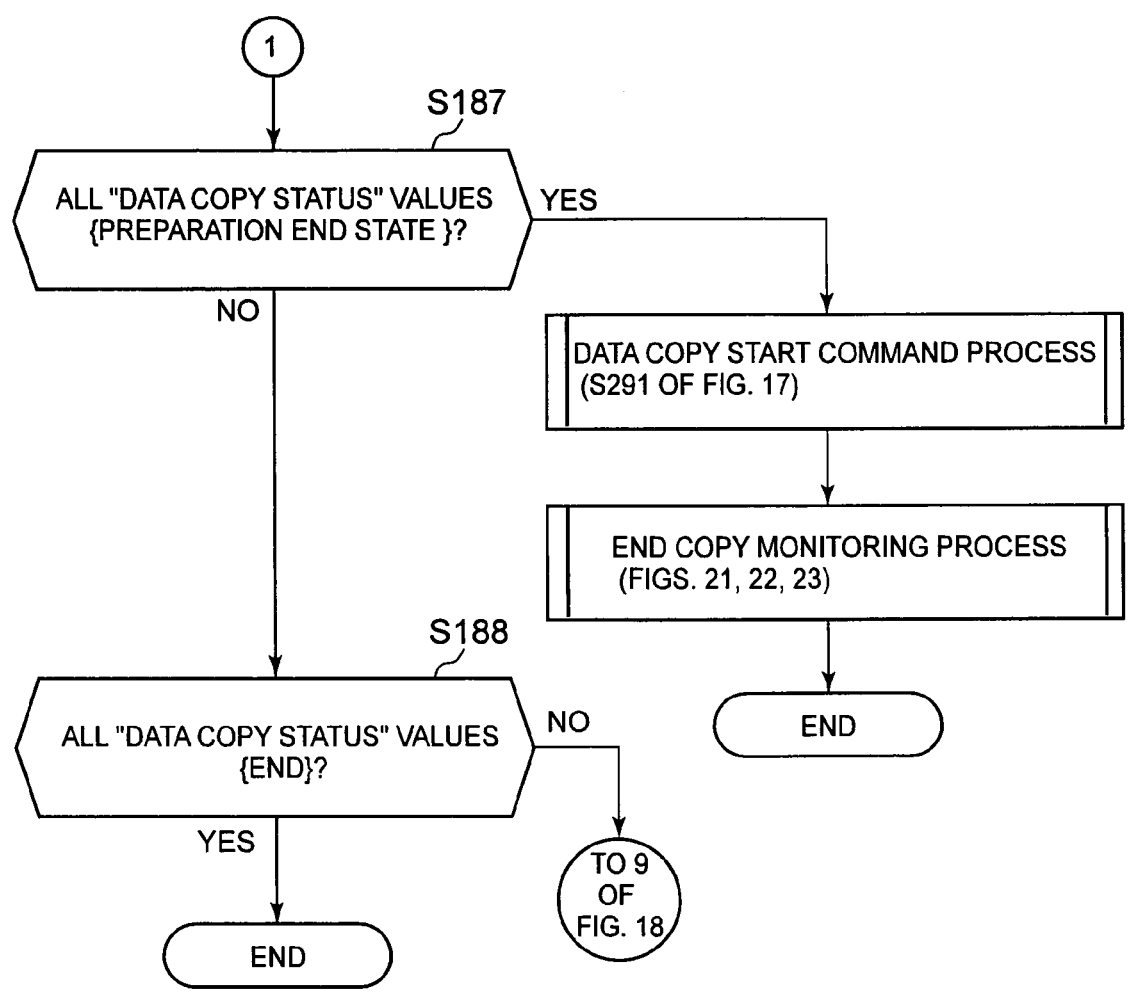
FIG. 19 shows the second part of an example of the flow of start copy monitoring processing.
Figure 20:
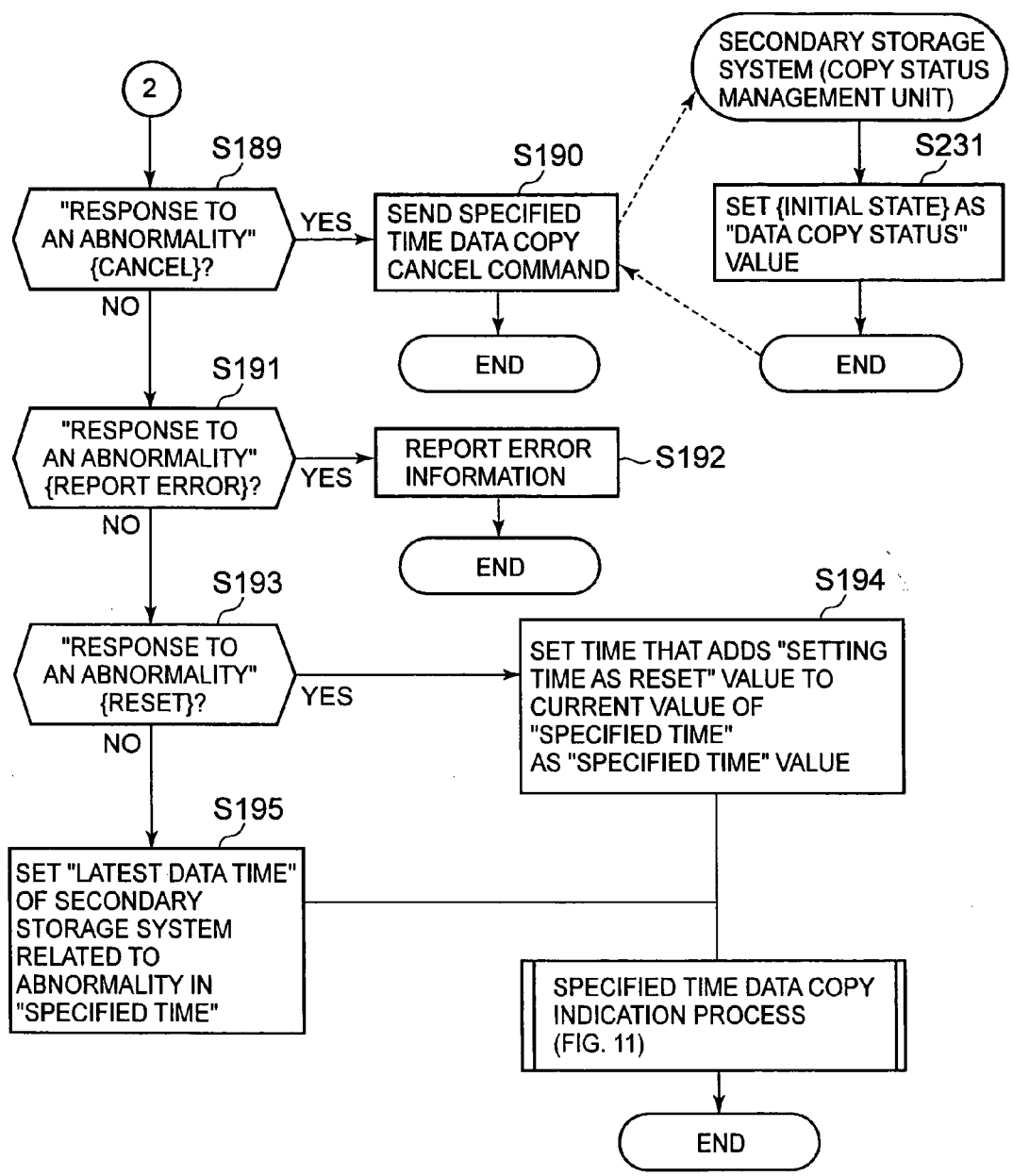
FIG. 20 shows the third part of an example of the flow of start copy monitoring processing.

Upon receiving a response from all (or at least one) of the secondary storage systems 40S1, 40S2, the specified time setting unit 304 boots up the data copy monitoring unit 305, and executes start copy monitor processing (Refer to FIGS. 18 through 20).

Figure 12:
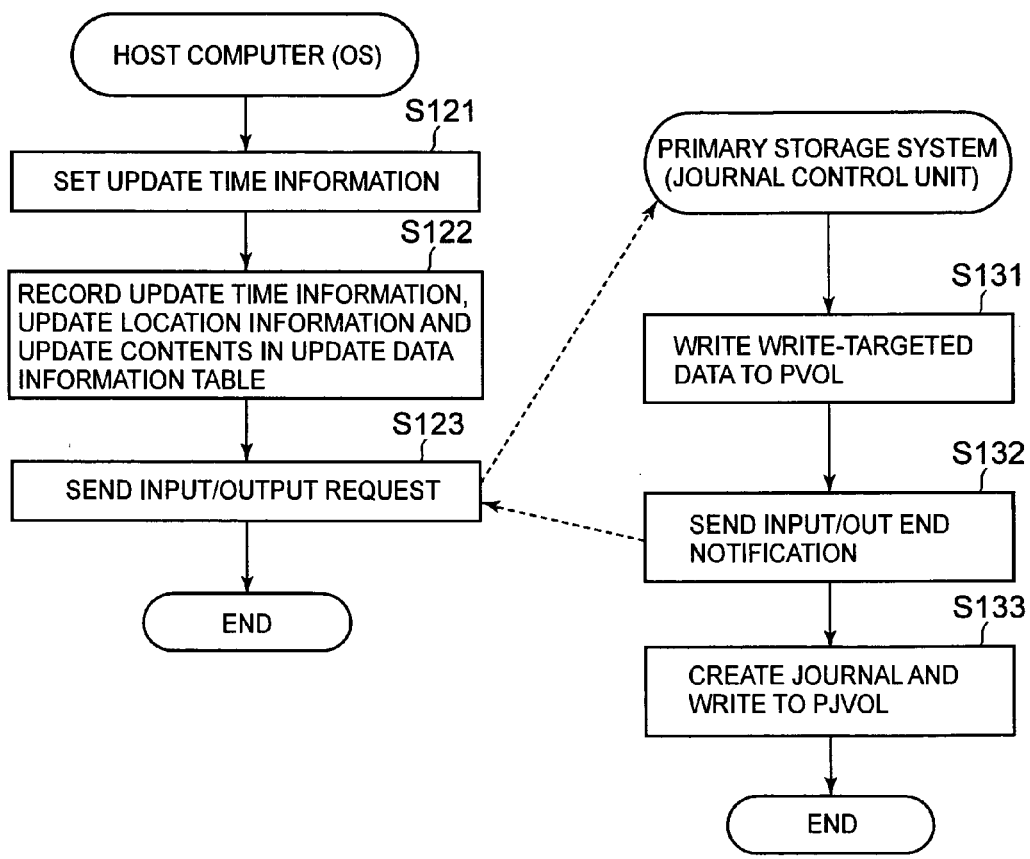
FIG. 12 shows an example of the flow of data update processing.

FIG. 12 shows an example of the flow of data update processing.

The OS 103, in response to an update request from the I/O control program 104, sets update time information (for example, information showing the time acquired from a timer, which is not shown in the figure, at the point when the update request was received) in the memory 1513, for example (S121). Further, the OS 103 records in the update data information table 204 write-targeted data (update contents) that conforms with the update request from the I/O control program 104, update location information showing the update location specified in this update request, and the above-mentioned update time information, which has been set (S122). Then, the OS 103 sends an input/output request (a write request for the write-targeted data) comprising the update time information and the update location information to either primary storage system 40P1 or 40P2 (S123).

In either primary storage system 40P1 or 40P2, which receives this input/output request, the journal control unit 403 writes the write-targeted data conforming to this input/output request to a location (a location inside the PVOL) shown in the update location information inside this input/output request (S131), and sends an end input/output notification to the host computer 10A (S132). Further, the journal control unit 403 writes a journal comprising the update time information and the update location information inside this input/output request, and the write-targeted data conforming to this input/output request to the PJVOL (S133). The update time information and the update location information inside this journal can be written to another location, such as shared memory 1025, instead of the PJVOL.

Figure 13:
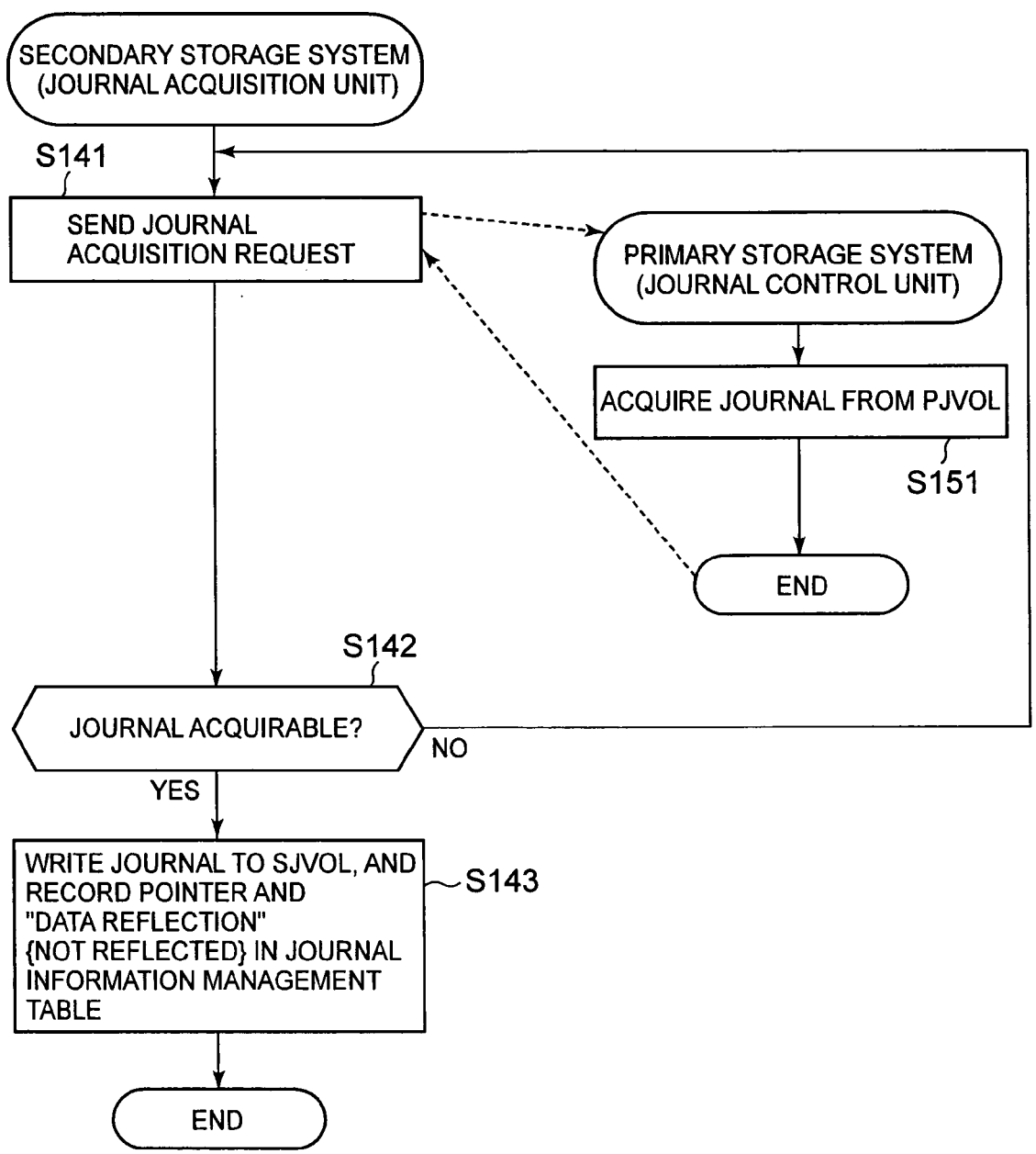
FIG. 13 shows an example of the flow of journal acquisition processing.
Figure 14:
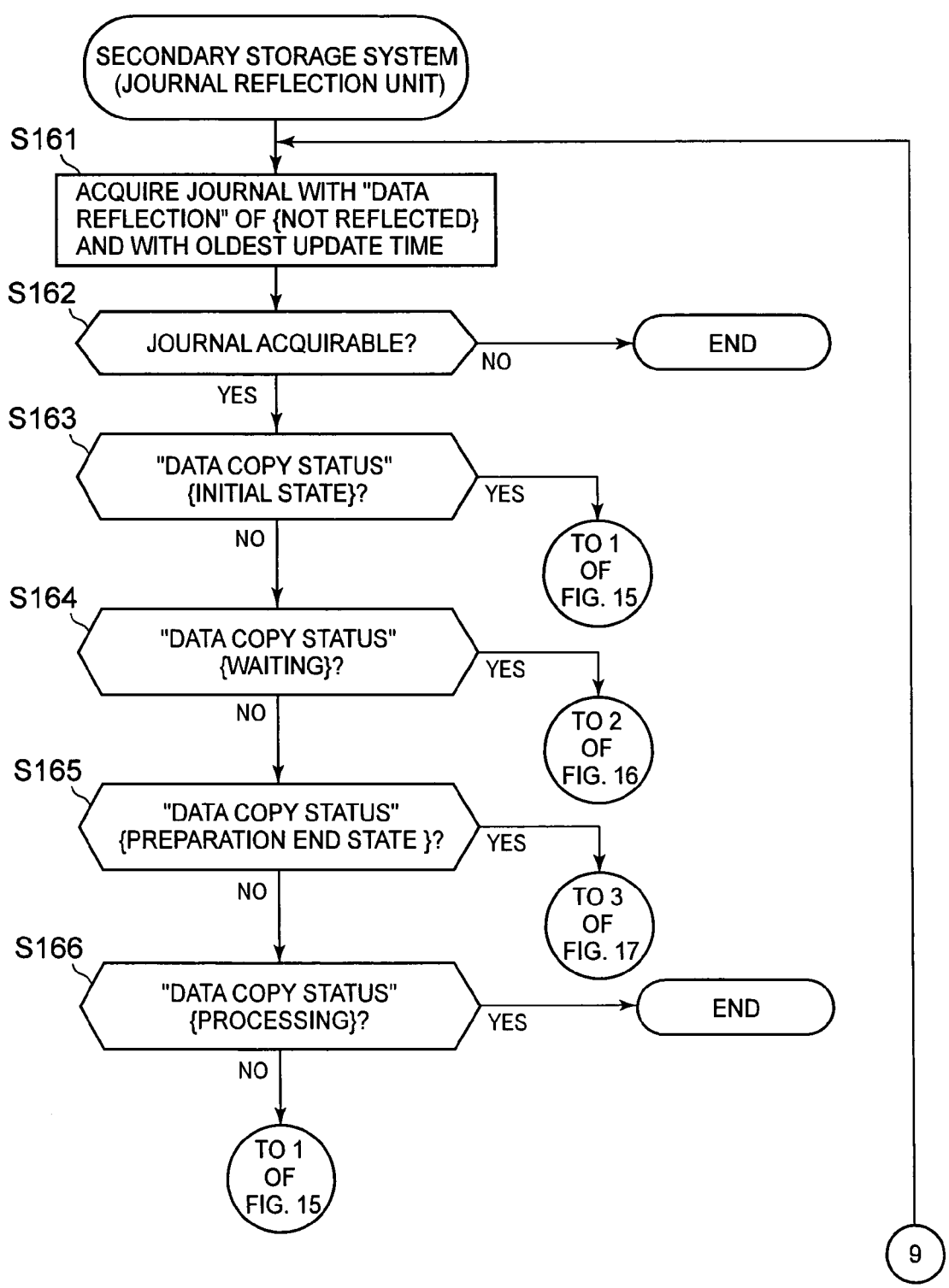
FIG. 14 shows the first part of an example of the flow of journal reflection control processing.

FIG. 13 shows an example of the flow of journal acquisition processing.

This processing is commenced regularly and automatically in the respective secondary storage systems 40S1, 40S2.

In the respective secondary storage systems 40S1, 40S2, the journal acquisition unit 504 sends a journal acquisition request to either primary storage system 40P1 or 40P2 (S141). In either the primary storage system 40P1 or 40P2, the journal control unit 403, in response to a journal acquisition request, acquires an unsent journal (S151), and sends the acquired journal to either secondary storage system 40S1 or 40S2, whichever is the source of the journal acquisition request (S151).

If the journal is acquirable (received) (S142: YES), the journal acquisition unit 504 writes this journal to the SJVOL, and records in the journal information management table 509 for this journal the pointer of this journal's write destination as the "pointer" value, and {not reflected} as the "data reflection" value.

Furthermore, according to this example, a journal is acquired from the primary storage systems 40P1, 40P2 in response to a request from the secondary storage systems 40S1, 40S2, but the primary storage systems 40P1, 40P2 can also actively send a journal to the secondary storage systems 40S1, 40S2 without receiving a request like this.

FIGS. 14 through 17 in combination show an example of the flow of journal reflection control processing.

In the respective secondary storage systems 40S1, 40S2, the data reflection unit 505 acquires from the SJVOL a journal, for which the "data reflection" value is {not reflected}, and the update time shown in the update time information inside the journal is the oldest (S161).

When the journal is acquirable (S162: YES), the data reflection unit 505 executes S167 of FIG. 15 if the "data copy status" value in the secondary data copy management table 508 is {initial state} (S163: YES), executes S169 in FIG. 16 if this value is {standing by} (S164: YES), executes S172 of FIG. 17 if this value if {preparation end state} (S165: YES), executes S167 of FIG. 15 if this value is not {processing} (S166: NO), and ends processing if this value is {processing} (S166: YES).

Figure 15:
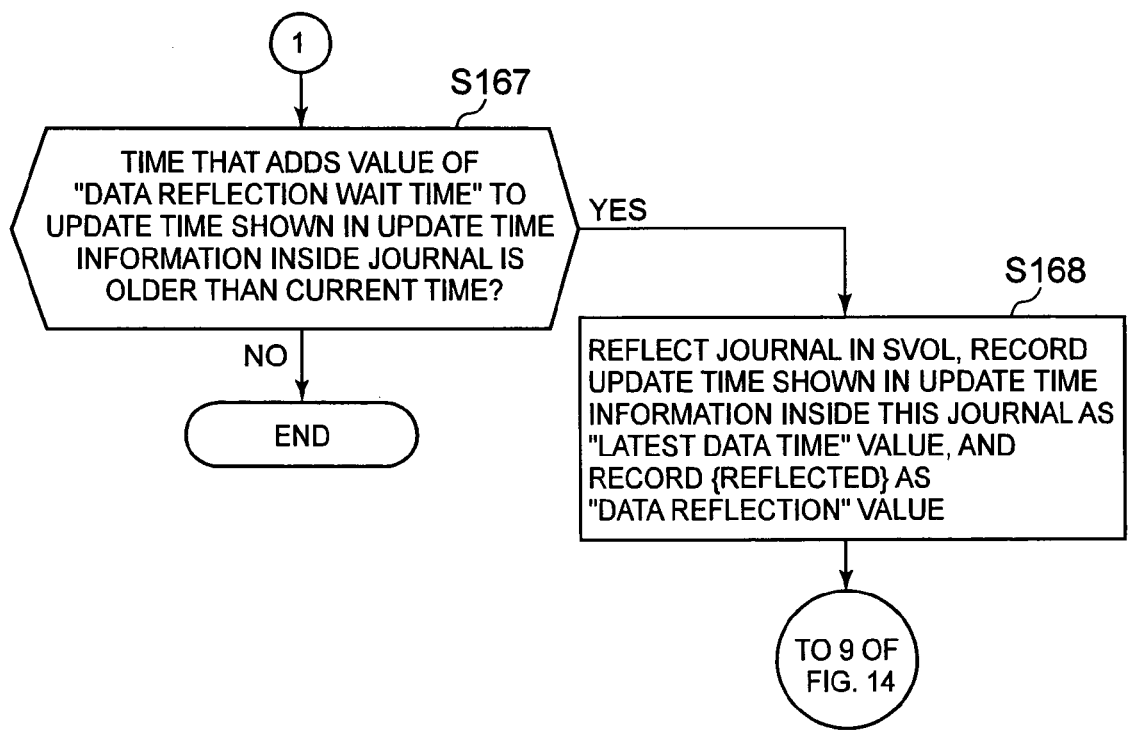
FIG. 15 shows the second part of an example of the flow of journal reflection control processing.

As shown in FIG. 15, in S167, the data reflection unit 505 determines whether or not a time, which adds the value of the "data reflection wait time" to the update time shown in the update time information inside the journal acquired in S161 is older than the current time. If this time is not older than the current time (S167: NO), the data reflection unit 505 ends processing without writing the data inside this journal to the SVOL. Conversely, if this time is older than the current time (S167: YES), the data reflection unit 505 writes the data inside this journal to the SVOL, records the update time shown in the update time information inside this journal in the secondary data copy management table 508 as the "latest data time" value, and changes the "data reflection" corresponding to this journal to {reflected} (S168).

Figure 16:
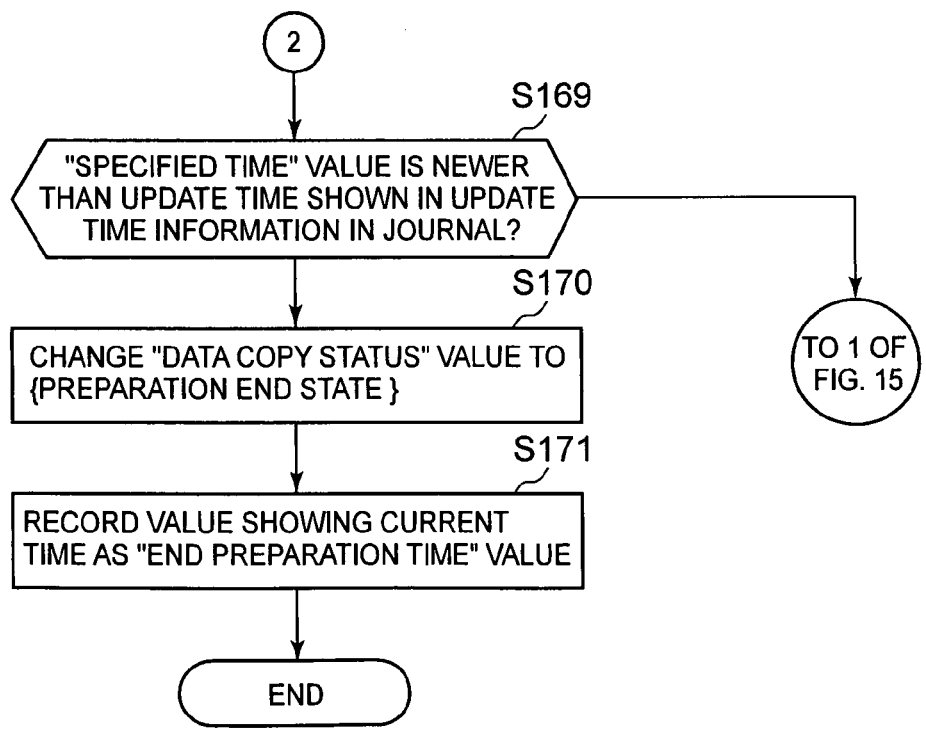
FIG. 16 shows the third part of an example of the flow of journal reflection control processing.

As shown in FIG. 16, in S169, the data reflection unit 505 determines whether or not the "update time" value in the secondary data copy management table 508 is newer than (in the future of) the update time shown in the update time information inside the journal acquired in S161. If this update time is newer (S169: YES), the data reflection unit 505 executes S167 of FIG. 15. Conversely, in this update time is not newer (S169: NO), the data reflection unit 505 changes the "data copy status" value to {preparation end state} (S170), and records the time of the point of this change (current time) as the "end preparation time" value (S171).

Figure 17:
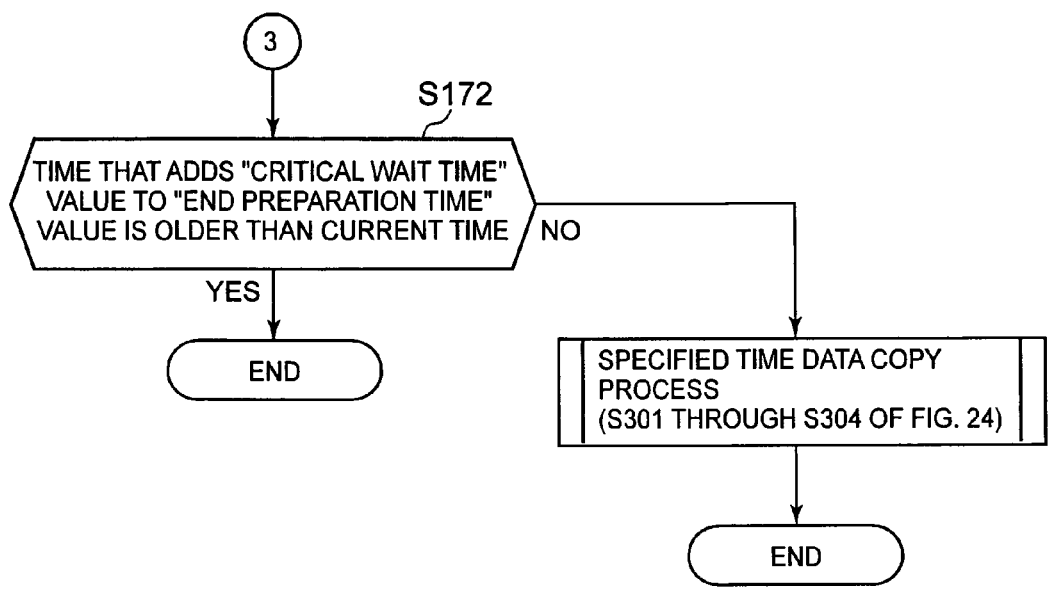
FIG. 17 shows the fourth part of an example of the flow of journal reflection control processing.

As shown in FIG. 17, in S172, the data reflection unit 505 determines whether or not a time, which adds the value of the "critical wait time" to the value of the "end preparation time" is older than the current time. If this time is older (S172: YES), processing ends, but if this time is not older than the current time (S172: NO), the data reflection unit 505 executes specified time data copy processing (S301 through S304 of FIG. 24). Furthermore, in this specified time data copy processing, a data copy from the SVOL to the BVOL is executed, but instead of this, another BVOL can be prepared, and a data copy can be executed from the SVOL to this other BVOL, or processing can be ended without executing a data copy.

FIGS. 18 through 20 in combination show an example of the flow of start copy monitor processing.

As shown in FIG. 18, the data copy monitoring unit 305 sends a copy status acquisition request to all the primary storage systems 40P1, 40P2 (S181). In the respective primary storage systems 40P1, 40P2, the copy status management unit 405, in response to this copy status acquisition request, acquires the value of the "remote copy status" in the primary copy data management table 407 (S201), and sends this value to the host computer 10A. If all the "remote copy status" values received from the primary storage systems 40P1, 40P2 are {normal} (S182: YES), the data copy monitoring unit 305 proceeds to S183, and if not (S182: NO), the data copy monitoring unit 305 proceeds to S189 of FIG. 20.

The data copy monitoring unit 305 sends a path status acquisition request to all of the primary storage systems 40P1, 40P2 (S183). In the respective primary storage systems 40P1, 40P2, the path status management unit 406, in response to this path status acquisition request, acquires the value of the "path status" in the primary copy data management table 407 (S211), and sends this value to the host computer 10A. If all the "path status" values received from all the primary storage system 40P1, 40P2 are {normal} (S184: YES), the data copy monitoring unit 305 proceeds to S185, and if not (S184: NO), the data copy monitoring unit 305 proceeds to S189 of FIG. 20.

A copy status acquisition request sent from the data copy monitoring unit 305 is sent to the respective secondary storage systems 40S1, 40S2 via the remote I/O control units 404 of the respective primary storage systems 40P1, 40P2 (S185). In the respective secondary storage systems 40S1, 40S2, the copy status management unit 507, in response to this copy status acquisition request, acquires the value of the "remote copy status" (S221) and acquires the value of the "data copy status" (S222) in the secondary copy data management table 508. These values are sent to the host computer 10A via the remote I/O control units 404 of the respective primary storage systems 40P1, 40P2. If all the "remote copy status" values received from all the primary storage systems 40P1, 40P2 are {normal} (S186: YES), the data copy monitoring unit 305 proceeds to S187 of FIG. 19, and if not (S186: NO), the data copy monitoring unit 305 proceeds to S189 of FIG. 20.

As shown in FIG. 19, if all the "data copy status" values received from all the primary storage systems 40P1, 40P2 are {preparation end state} (S187: YES), the data copy monitoring unit 305 carries out data copy start command processing (S291 of FIG. 17), and executes end copy monitor processing (refer to FIGS. 21, 22 and 23). Conversely, if at least one of the "data copy status" values is not {preparation end state} (S187: NO), and all the "data copy status" values are {end} (S188: YES), the data copy monitoring unit 305 ends processing, and if this is not the case (S188: NO), the data copy monitoring unit 305 returns to S181 of FIG. 18.

As shown in FIG. 20, if the value of the "response to an abnormality" recorded in the data copy indication information table 309 is {cancel} (S189: YES), the data copy monitoring unit 305 sends a specified time data copy cancel command to all of the secondary storage systems 40S1, 40S2 (S190). In response to this, the copy state management unit 507 records {initial state} as the value of the "data copy status" in the respective secondary storage systems 40S1, 40S2 (S231).

If the "response to an abnormality" value recorded in the data copy indication information table 309 is {report error} (S191: YES), the data copy monitoring unit 305 reports error information (S192). The report, for example, can be sent as an e-mail addressed to the administrator, or it can be displayed on the display device of the host computer 10A.

If the "response to an abnormality" value recorded in the data copy indication information table 309 is {reset} (S193: YES), the data copy monitoring unit 305 records in the data copy indication information table 309 as the "specified time" value a value (time), which adds the value of the "setting time at reset" to the current value of the "specified time" recorded in the data copy indication information table 309 (S194). Thereafter, the data copy monitoring unit 305 invokes the specified time setting unit 304, and starts S101 of FIG. 11. Consequently, specified time data copy indication processing is carried out once again.

If the "response to an abnormality" value recorded in the data copy indication information table 309 is {acquire latest data} (S193: NO), the data copy monitoring unit 305 queries the "latest data time" value (update time shown in the update time information inside the journal most recently reflected to the SVOL from the SJVOL) in secondary storage system 40S1 and/or 40S2, which returned {abnormal} as the value of the "remote copy status", and records the value of the "latest data time" received in response to this query in the current value of the "specified time" recorded in the data copy indication information table 309 (S194). Thereafter, the data copy monitoring unit 305 invokes the specified time setting unit 304, and starts S101 of FIG. 11. Consequently, specified time data copy indication processing is carried out once again.

The preceding is an explanation of the flow of end copy monitor processing. Furthermore, in the above-described processing flow, for example, there can also be a host wait time. The start of the count for this wait time, for example, can be set to various points in time, such as when the specified time data copy acquisition indication is sent, or when the copy status acquisition request is sent. Further, the count for the host wait time, for example, can be canceled at various points in time, such as when {preparation end state} is received as the "data path status" value, or when {abnormal} is received as the "remote copy status" value. When wait time has elapsed without reaching this cancel point, the copy control program 105 can send a specified time data copy cancel command. Further, the host wait time is shorter than the value of the "critical wait time". Further, the timing for sending a specified time data copy acquisition indication, comprising either information showing a new specified time or information showing a reset specified time, can be set at the timing at which abnormality recovery is detected, such as when {normal} is received as the "remote copy status" value.

Figure 21:
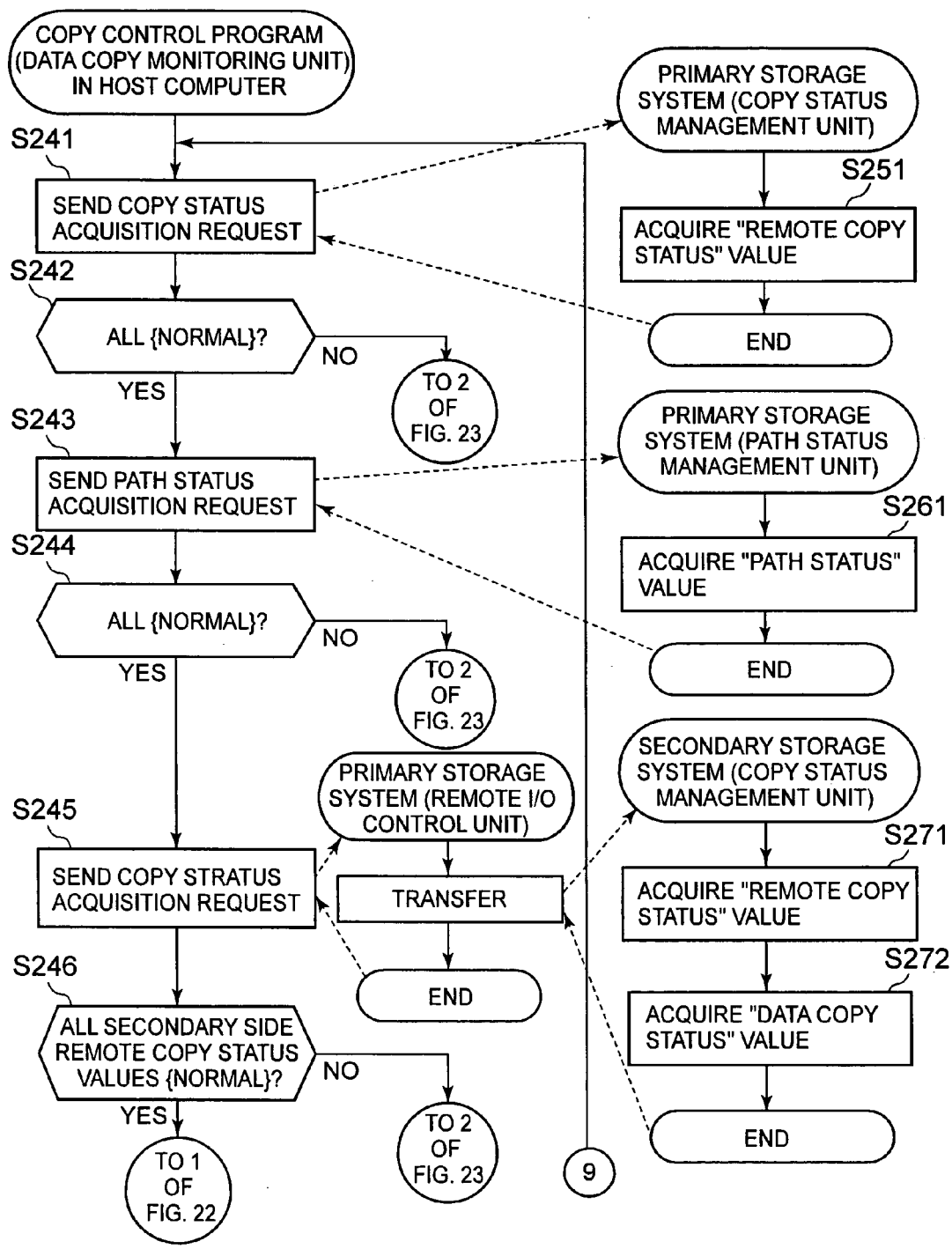
FIG. 21 shows the first part of an example of the flow of end copy monitoring processing.
Figure 22:
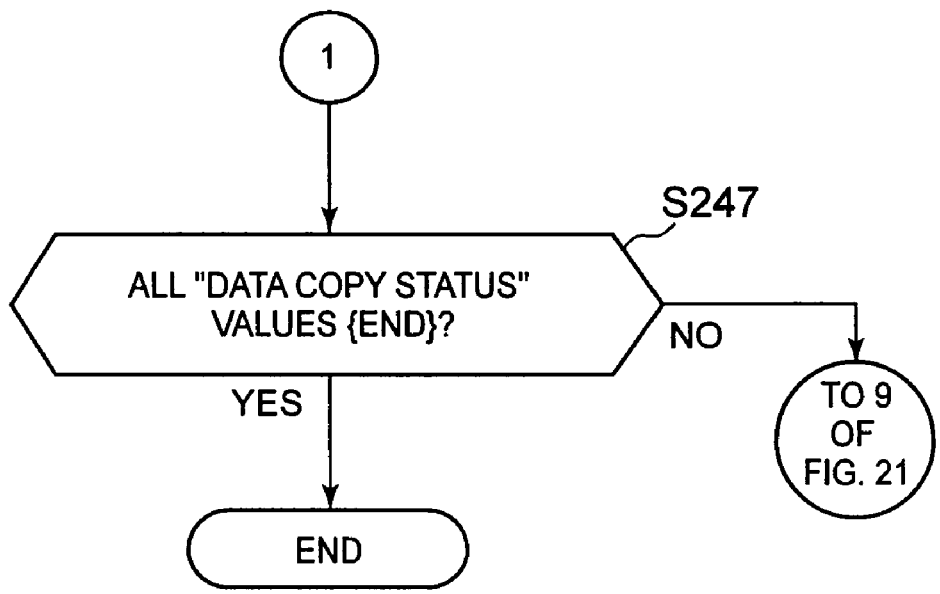
FIG. 22 shows the second part of an example of the flow of end copy monitoring processing.
Figure 23:
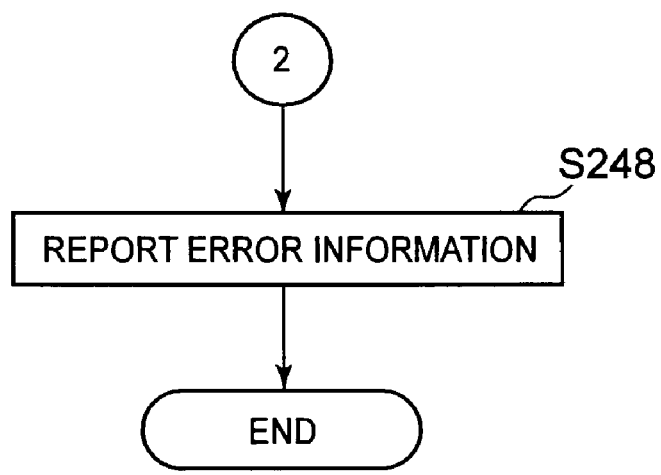
FIG. 23 shows the third part of an example of the flow of end copy monitoring processing.

FIGS. 21 through 23 in combination show an example of the flow of end copy monitor processing.

S241, S242, S243, S244, S245, S246, S251, S261, S271 and S272 shown in FIG. 21 correspond respectively to S181, S182, S183, S184, S185, S186, S201, S211, S221 and S222 explained by referring to FIG. 18. When S242, S244 and S246 are NO, processing proceeds to S248 of FIG. 23. When S246 is YES, processing proceeds to S247 of FIG. 22.

In S247 of FIG. 22, if the "data copy status" values received from all the secondary storage systems 40S1, 40S2 are {end} (S247: YES), the data copy monitoring unit 305 ends processing, and if not (S247: NO), the data copy monitoring unit 305 returns to S231 of FIG. 21.

In S248 of FIG. 23, the data copy monitoring unit 305 reports error information.

Figure 24:
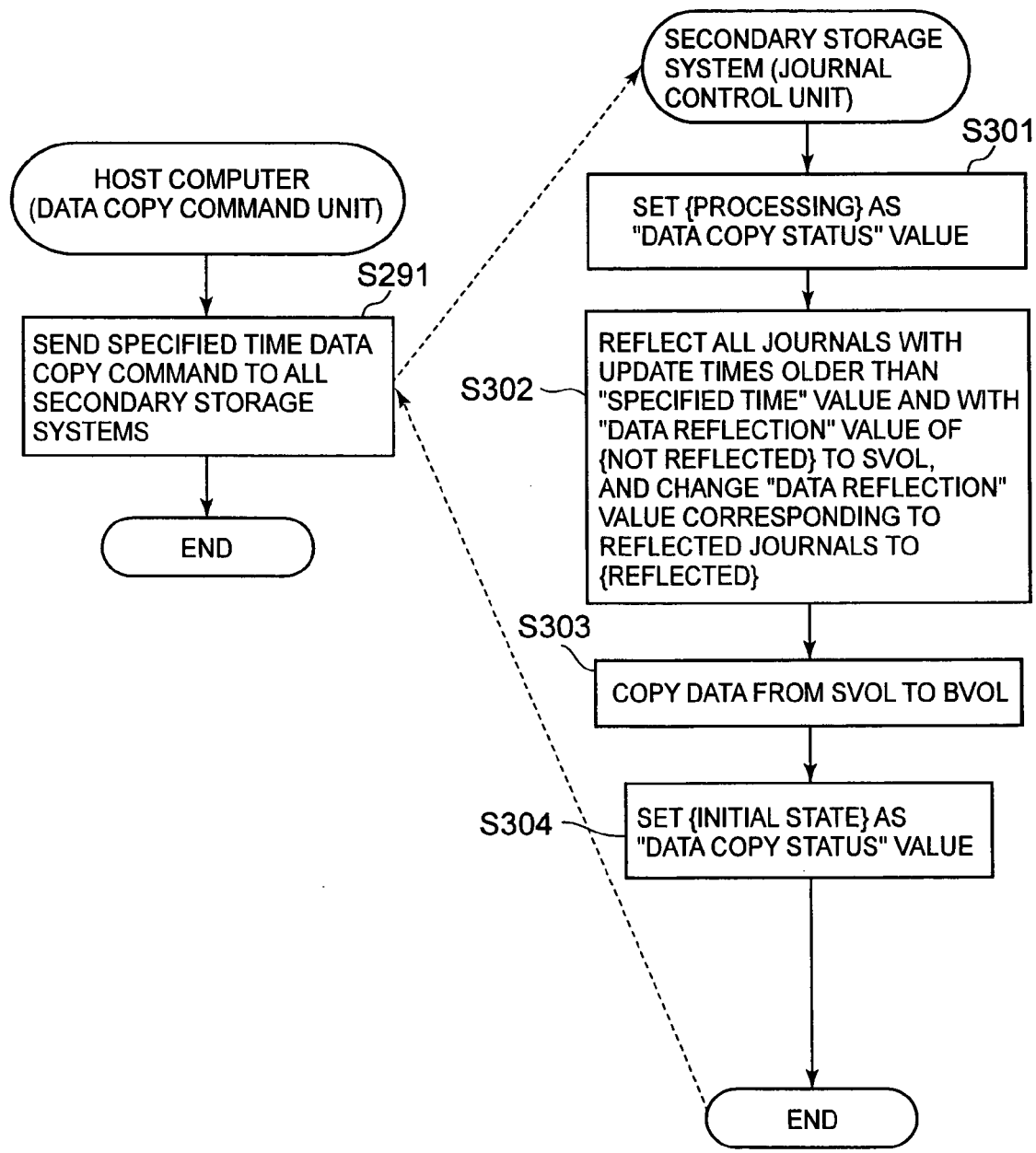
FIG. 24 shows examples of the respective flows of data copy start command processing and specified time data copy processing.
Figure 25:
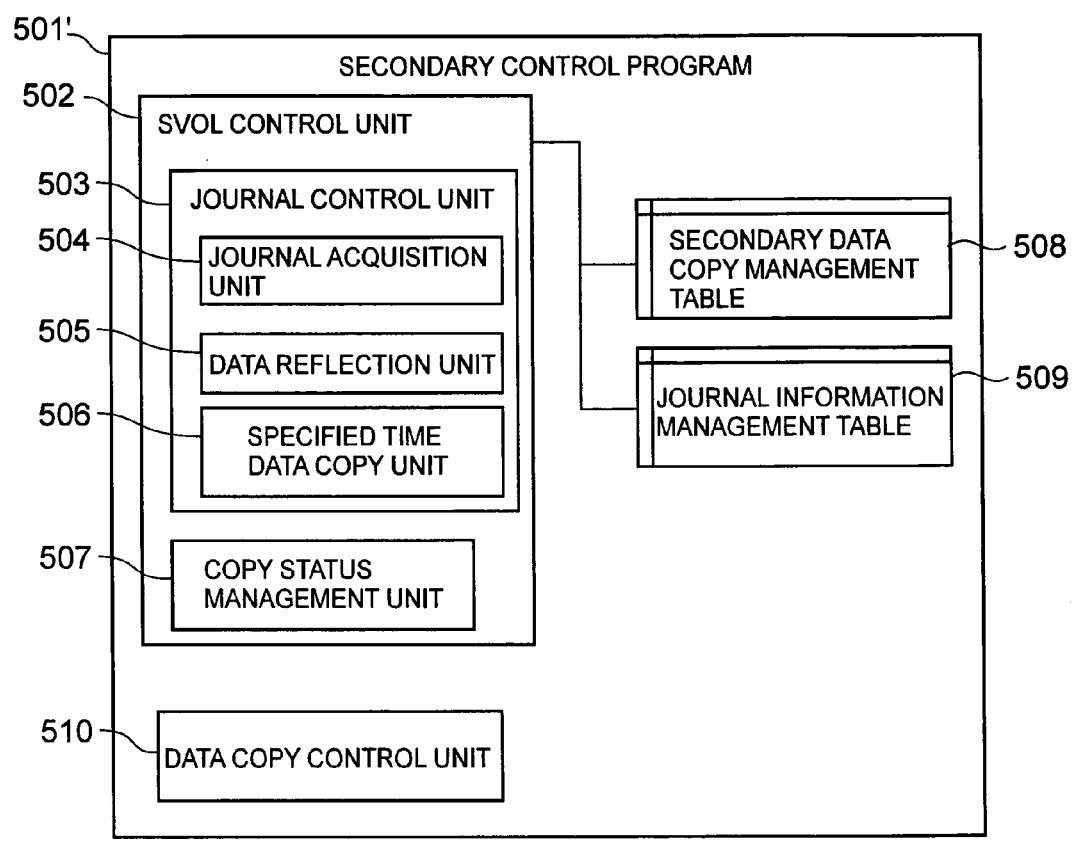
FIG. 25 shows a secondary control program, which is executed by a first secondary storage system in a second embodiment of the present invention.

FIG. 24 shows examples of the respective flows of data copy start command processing and specified time data copy processing.

In S291, data copy start command processing is carried out. More specifically, the copy command unit 306 sends a specified time data copy command to all the secondary storage systems 40S1, 40S2.

In S301 through S304, specified time data copy processing is carried out in the respective secondary storage systems 40S1, 40S2. More specifically, the journal control unit 503 sets {processing} as the value of the "data copy status" in the secondary data copy management table 508 in response to a specified time data copy command (S301). Thereafter, the journal control unit 503 reflects all journals with an update time that is older than the "specified time" value, and a "data reflection" value of {not reflected} to the SVOL, and changes the "data reflection" values corresponding to these journals to {reflected } (S302). Then, the journal control unit 503 performs a data copy to copy the data inside the SVOL to the BVOL (S303), and when that ends, sets the value of the "data copy status" to {initial state}.

According to the first embodiment explained hereinabove, when the host computer 10A is able to acquire {preparation end state} as the "data copy status" value from all of the secondary storage systems 40S1, 40S2, the host computer 10A backs up the data inside the SVOL to the BVOL by sending a specified time data copy command to all of the secondary storage systems 40S1, 40S2. If a {preparation end state} cannot be acquired as the "data copy status" value from at least one secondary storage system 40S, the host computer 10A does not sent a specified time data copy command to all of the secondary storage systems 40S1, 40S2. Consequently, it is possible to maintain the consistency of a plurality of BVOLs that exist in a plurality of secondary storage systems 40S1, 40S2. Further, since consistency can be maintained at all times like this in a plurality of BVOLs, one BVOL can be prepared for one remote copy pair.

Further, according to the first embodiment described hereinabove, if {acquire new data} is set as the value of the "response to an abnormality", the host computer 10A acquires the "latest data time" value from secondary storage systems 40S1 and/or 40S2 related to the abnormality, makes the acquired value the "specified time" value, and once again sends a specified time data copy acquisition indication to all the secondary storage systems 40S1 and 40S2. The value of the "latest data time" is the update time shown in the update time information inside the journal most recently reflected to the SVOL. Thus, when a failure occurs, it is possible to acquire a backup of data of the most recent time for all of the secondary storage systems 40S1 and 40S2.

Second Embodiment

A second embodiment of the present invention will be explained hereinbelow. Mainly the points of difference with the first embodiment will be explained below, and explanations of points that the second embodiment shares in common with the first embodiment will either be omitted or simplified (Furthermore, this will hold true for the third and subsequent embodiments, which will be explained hereinbelow.).

Figure 26:
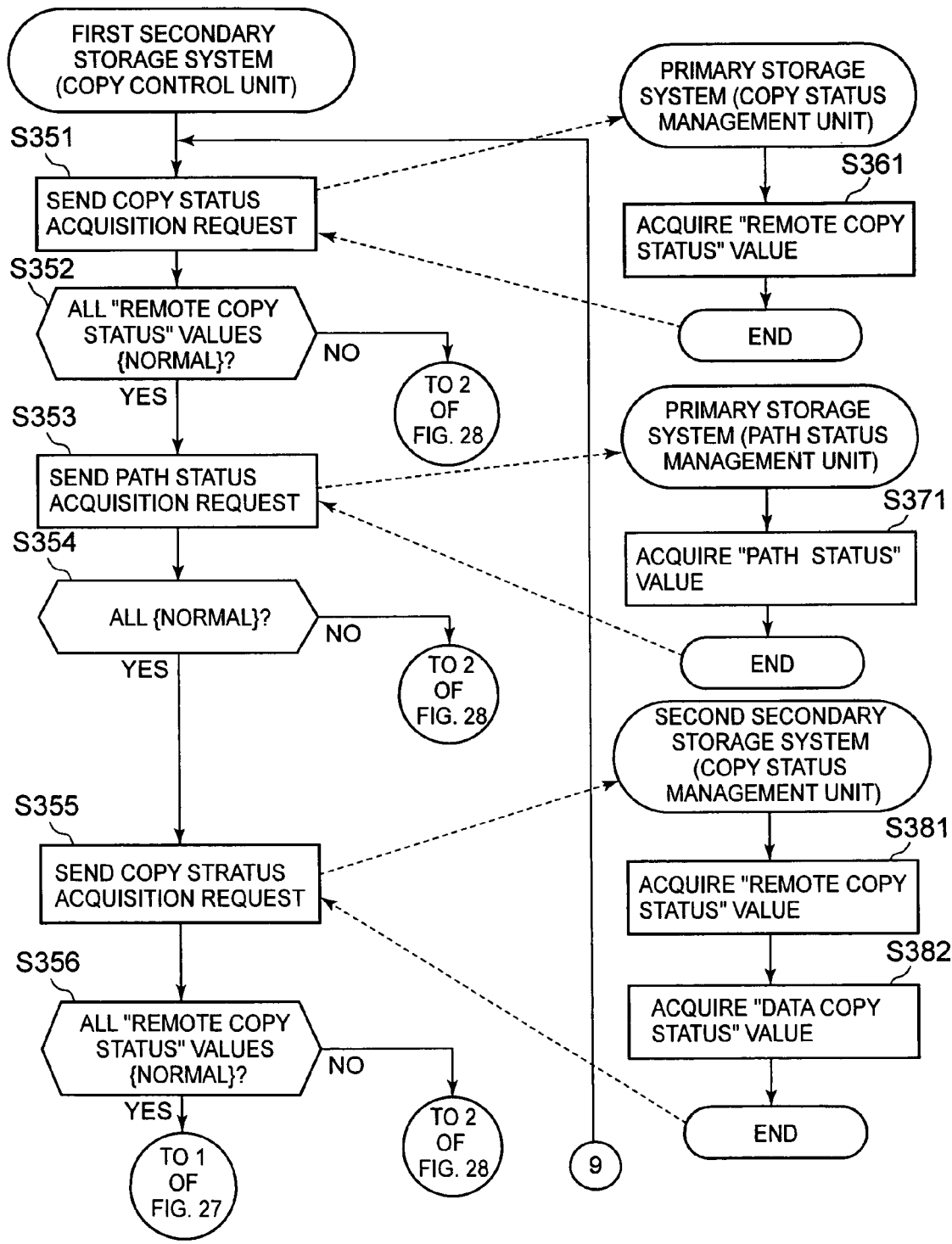
FIG. 26 shows the first part of an example of the flow of start copy monitoring processing in a second embodiment of the present invention.
Figure 27:
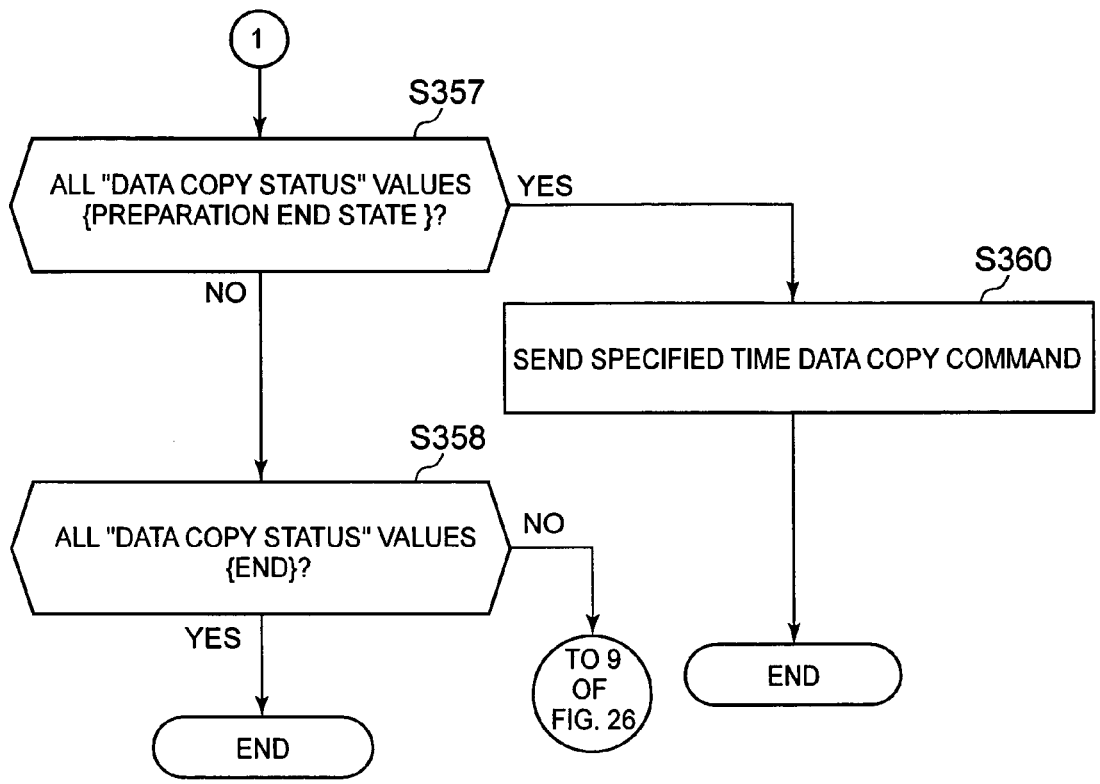
FIG. 27 shows the second part of an example of the flow of start copy monitoring processing in a second embodiment of the present invention.
Figure 28:
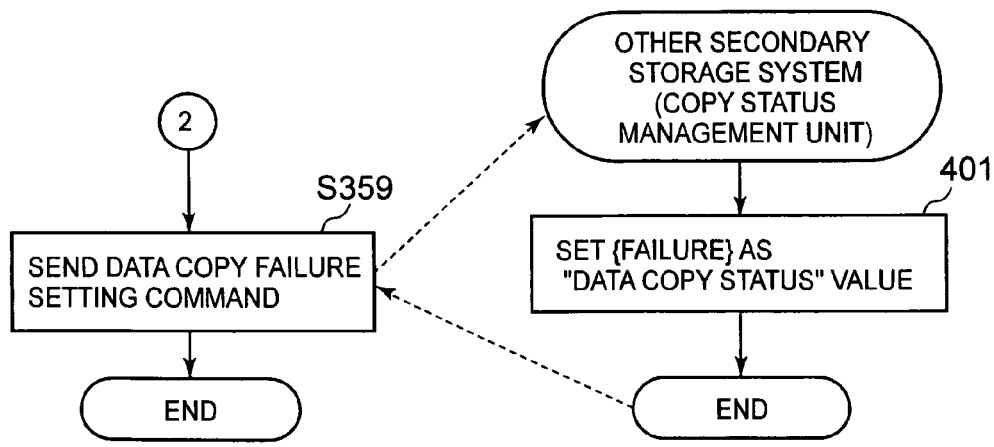
FIG. 28 shows the third part of an example of the flow of start copy monitoring processing in a second embodiment of the present invention.

In the second embodiment, a first secondary storage system 40S1 receives {preparation end state} as the value of the "data copy status" from the second secondary storage system 40S2, and sends a specified time data copy command to the second secondary storage system 40S2. More specifically, for example, a secondary control program 501' of the first secondary storage system 40S1 further comprises a data copy control unit 510, and start copy monitor processing, which is showed by combining FIGS. 26, 27 and 28, is executed. The start copy monitor processing of the second embodiment will be explained below by referring to FIGS. 26, 27 and 28.

The data copy control unit 510 sends a copy status acquisition request to all of the primary storage systems 40P1, 40P2 (S351). The copy status management unit 405 acquires the "remote copy status" value in the primary copy data management table 407 in the respective primary storage systems 40P1, 40P2 in response to this copy status acquisition request (S361), and sends this value to the first secondary storage system 40S1. If all of the "remote copy status" values received from the primary storage systems 40P1, 40P2 are {normal} (S352: YES), the data copy control unit 510 proceeds to S183, and if this is not the case (S352: NO), the data copy control unit 510 proceeds to S359 of FIG. 28.

The data copy control unit 510 sends a path status acquisition request to all of the primary storage systems 40P1, 40P2 (S353). The path status management unit 406 acquires the "path status" value in the primary copy data management tables 407 in the respective primary storage systems 40P1, 40P2 in response to this path status acquisition request (S371), and sends this value to the first secondary storage system 40S1. If all of the "path status" values received from all of the primary storage systems 40P1, 40P2 are {normal} (S354: YES), the data copy control unit 510 proceeds to S355, and if this is not the case (S354: NO), the data copy control unit 510 proceeds to S359 of FIG. 28.

The data copy control unit 510 sends a copy status acquisition request to the second secondary storage system 40S2 (S185). The copy status management unit 507 acquires the "remote copy status" value in the secondary copy data management table 508 in the second secondary storage system 40S2 in response to this copy status acquisition request (S381), and acquires the value of the "data copy status" (S382). These values are sent to the first secondary storage system 40S1. If the "remote copy status" value received from the second secondary storage system 40S2, and the "remote copy status" value in the first secondary storage system 40S1 are {normal} (S356: YES), the data copy control unit 510 proceeds to S357 of FIG. 27, and if this is not the case (S356: NO), the data copy control unit 510 proceeds to S359 of FIG. 28.

As shown in FIG. 27, if the "data copy status" value received from the second secondary storage system 40S2, and the "data copy status" in the first secondary storage system 40S1 are {preparation end state} (S357: YES), the data copy control unit 510 sends a specified time data copy command to the second secondary storage system 40S2, and to the journal control unit 503 in the first secondary storage system 40S1 (S360). Conversely, if at least one of the "data copy status" values is not {preparation end state} (S357: NO), and all the "data copy status" values are {end} (S358: YES), the data copy control unit 510 ends processing, and if this is not the case (S358: NO), the data copy control unit 510 returns to S351 of FIG. 26.

As shown in FIG. 28, in S359, the data copy control unit 510 sends a data copy failure setting command to the second secondary storage system 40S2. In response to this, the copy status management unit 507 sets {failure} as the "data copy status" in the second secondary storage system 40S2 (S401).

The preceding is an explanation of the second embodiment. Furthermore, in this explanation, a first secondary storage system 40S1 receives a "data copy status" value and sends a specified time data copy command in place of the host computer 10A, but another apparatus can be employed instead of the first secondary storage system 40S1, such as any other secondary storage system, any primary storage system, or a management computer for managing one or a plurality of secondary storage systems.

Third Embodiment

Figure 29:
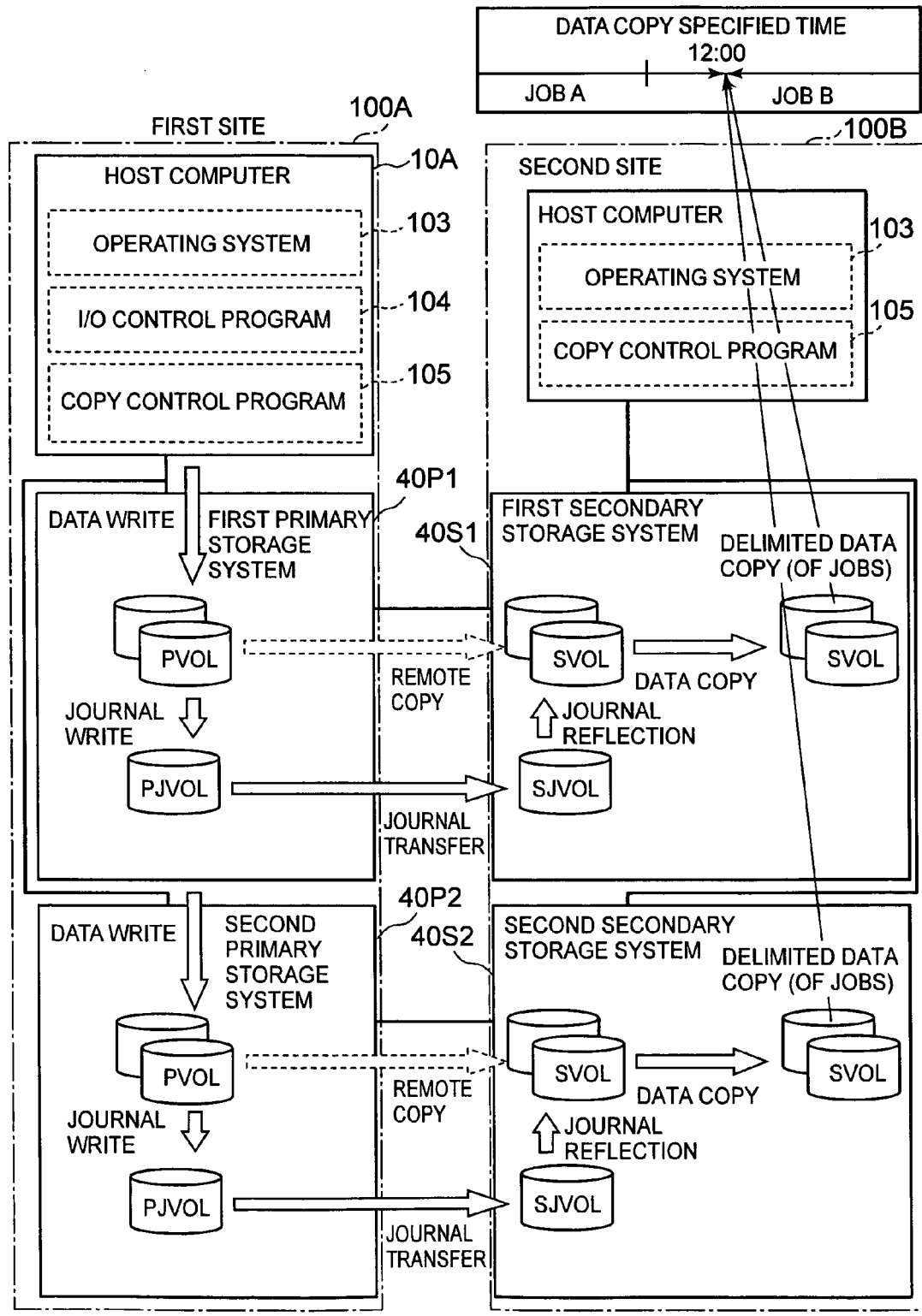
FIG. 29 shows an example of the constitution of a computer system related to a third embodiment of the present invention.

FIG. 29 shows an example of the constitution of a computer system related to a third embodiment of the present invention.

In the second site 10b, there is a host computer 10B, which is connected to at least one of a first secondary storage system 40S1 and a second secondary storage system 40S2. The host computer 10B comprises an operating system 103 and a copy control program 105. The copy control program 105 of the host computer 10B receives a "data copy status" value and sends a specified time data copy command instead of the copy control program 105 of the host computer 10A.

Fourth Embodiment

Figure 30:
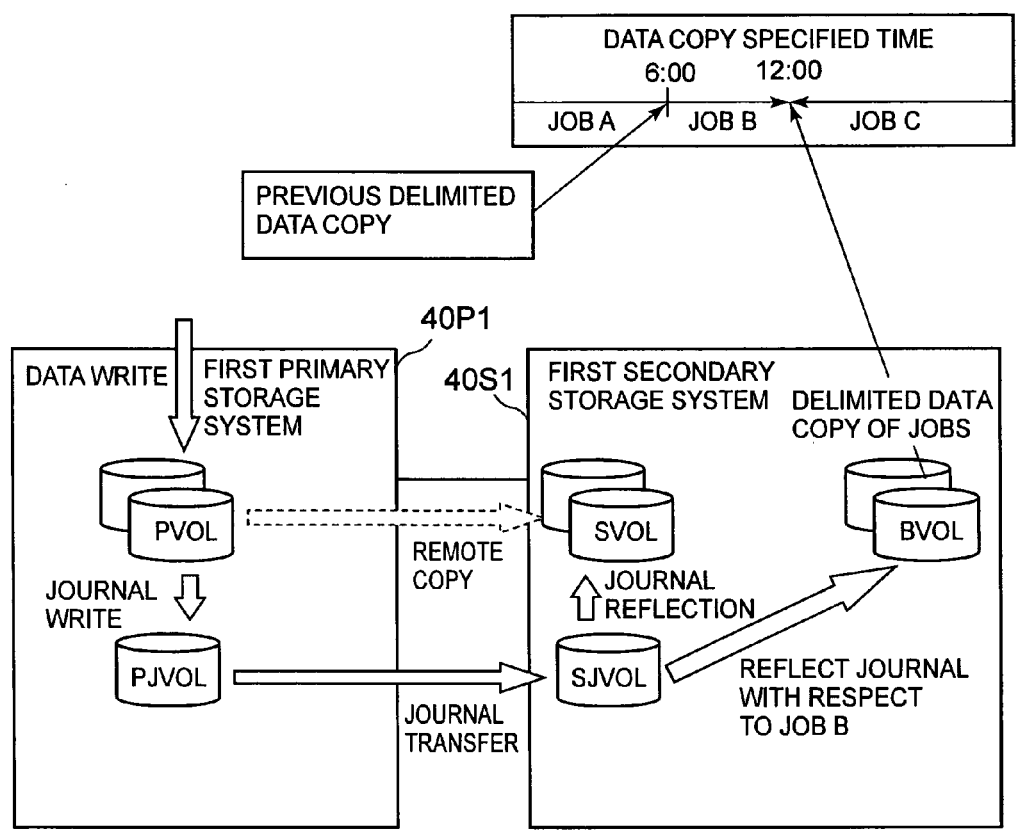
FIG. 30 shows one part of an example of the constitution of a computer system related to a fourth embodiment of the present invention.

FIG. 30 shows one portion of an example of the constitution of a computer system related to a fourth embodiment of the present invention.

In this fourth embodiment, the respective secondary storage systems 40S1, 40S2 acquire a data backup for a specified time in the BVOL by reflecting in the BVOL a journal read out from the SJVOL. More specifically, the respective secondary storage systems 40S1, 40S2 reflect in the BVOL data from a journal, which has update time information showing an update time subsequent to an update time shown in update time information inside the journal reflected immediately prior, to a journal, which has update time information showing an update time, which does not exceed a specified time and which is closest to the specified time. According to the example shown in the figure, a journal for job B (06:00 to 12:00), which is stored in the SJVOL, is reflected to the BVOL, which is storing data delimited data up to job A (06:00). In this fourth embodiment, unlike the first embodiment, there is no need for processing that stops the reflection to the SVOL of a journal comprising update time information showing an update time that is newer than a specified time.

Figure 31:
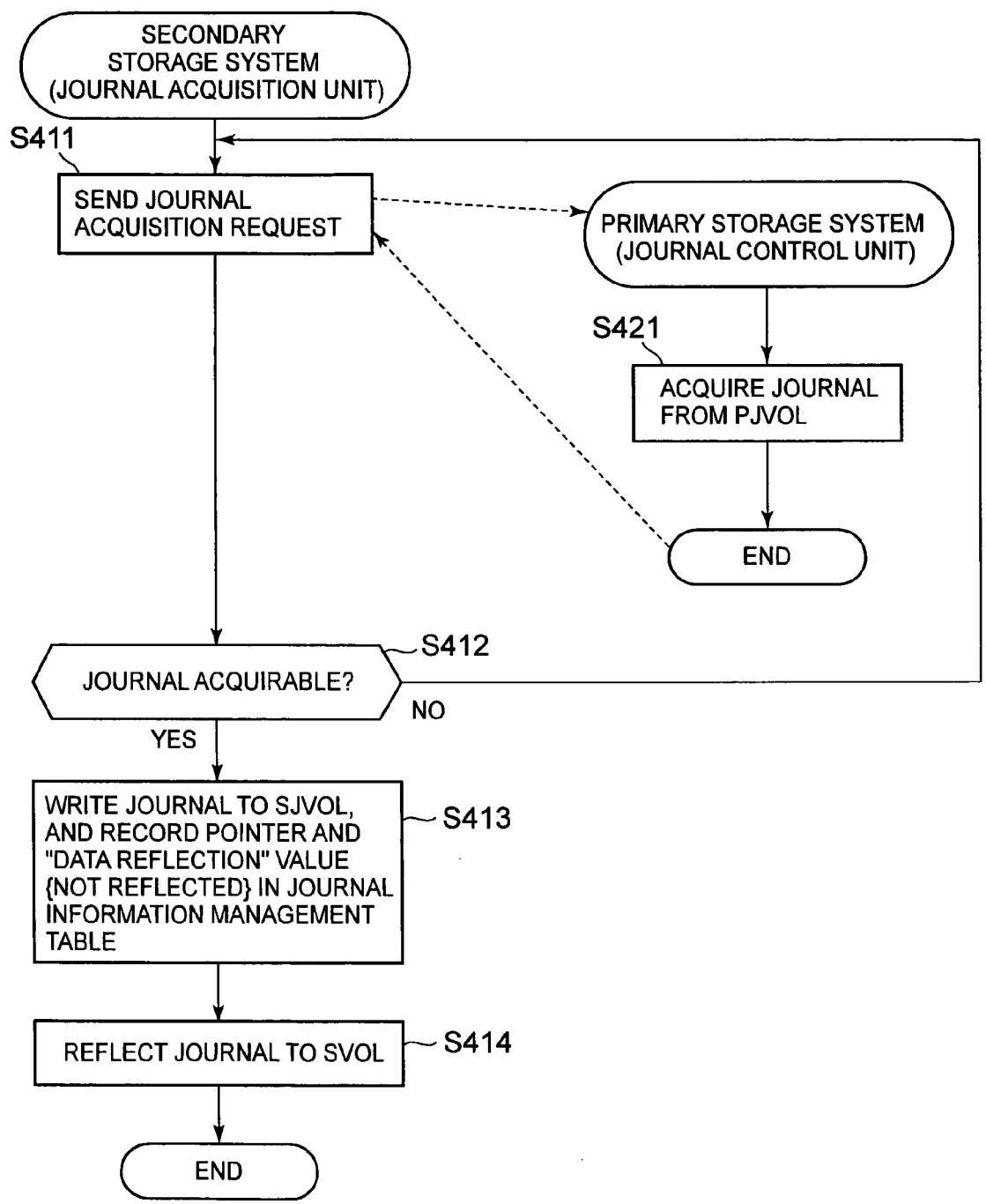
FIG. 31 shows an example of the flow of journal acquisition processing in a fourth embodiment of the present invention.

FIG. 31 shows an example of the flow of journal acquisition processing in the fourth embodiment.

The journal acquisition unit 504 in the respective secondary storage systems 40S1, 40S2 sends a journal acquisition request to either primary storage system 40P1 or 40P2 (S411). The journal control unit 403 acquires an unsent journal from the PJVOL in either primary storage system 40P1 or 40P2 in response to the journal acquisition request (S421), and sends the acquired journal to either secondary storage system 40S1 or 40S2, whichever is the source of the journal acquisition request.

If a journal is acquirable (received) (S412: YES), the journal acquisition unit 504 writes this journal to the SJVOL, and in the journal information management table 509 records the write-destination location in the SJVOL as the "pointer" value, and records {not reflected} as the "data reflection" value for this journal (S413). Then, the journal acquisition unit 504 reflects the journal written to the SJVOL in the SVOL (S414).

That is, in this fourth embodiment, when a journal is written to the SJVOL, the journal acquisition unit 504 can immediately reflect this journal in the SVOL.

Figure 32:
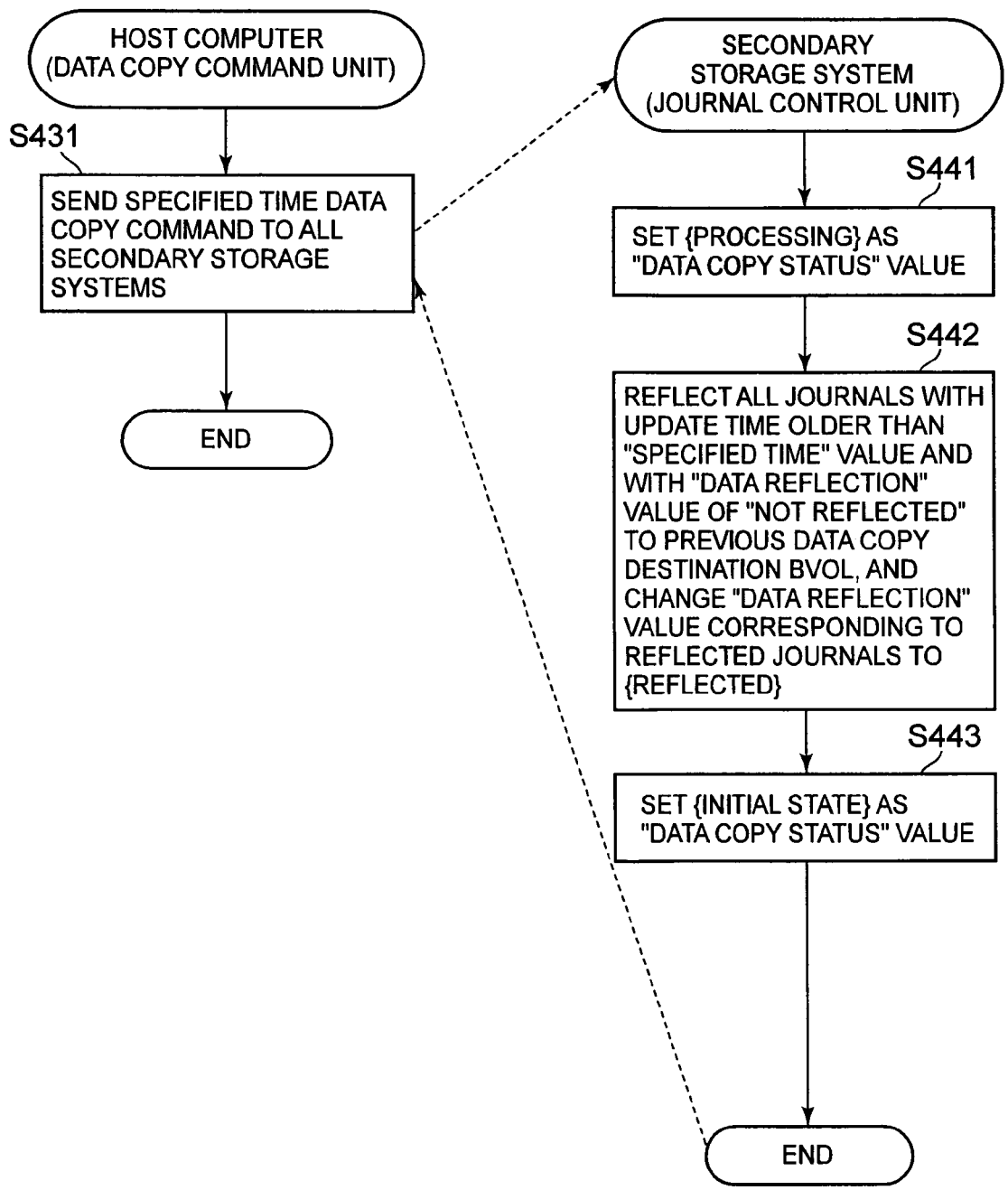
FIG. 32 shows examples of the respective flows of data copy start command processing and specified time data copy processing in a fourth embodiment of the present invention.

FIG. 32 shows examples of the respective flows of data copy start command processing and specified time data copy processing in the fourth embodiment.

In S431, data copy start command processing is carried out. More specifically, the copy command unit 306 sends a specified time data copy command to all the secondary storage systems 40S1, 40S2.

Specified time data copy processing is carried out in the respective secondary storage systems 40S1, 40S2 via S441 through S443. More specifically, the journal control unit 503 sets {processing} in the secondary data copy management table 508 as the "data copy status" value in response to the specified time data copy command (S441). Thereafter, the journal control unit 503 reflects all journals with an update time that is older that the "specified time" value and a "data reflection" value of {not reflected}, to the previous data copy destination BVOL, and changes the "data reflection" values corresponding to the reflected journals to {reflected} (S442). Then, the journal control unit 503 sets {initial state} as the "data copy status" value (S443).

According to this fourth embodiment, the "data reflection" values for the respective journals stored in the SJVOL signify whether or not a journal has been reflected to the BVOL rather than whether or not a journal has been reflected to the SVOL. Thus, of all the journals stored in the SJVOL, the plurality of journals, which comprise information showing a "data reflection" value of {not reflected}, and an update time that does not exceed a "specified time" value, constitute a group of one delimiter's worth of journals (for example, a group of a prescribed job's worth of journals). Accordingly, in a processing flow like that described hereinabove, a backup of one delimiter's worth of data can be acquired in the BVOL by reflecting the journals stored in the SJVOL to the BVOL. Further, since the reflection of journals to this BVOL is carried out when all the "data copy status" values are {preparation end state}, the consistency of a plurality of BVOLS can be maintained. Incidentally, in this fourth embodiment, there is no need to manage in the SVOL whether or not a journal has been reflected to the SVOL because a journal is reflected to the SVOL whenever this journal is written to the SJVOL.

Fifth Embodiment

In a fifth embodiment of the present invention, first and second modes are prepared. The host computer 10A receives a consistency group specification from a user.

FIG. 35A shows an example of the flow of consistency group specification processing.

The data copy control unit 303 receives a specification for a consistency group from a user (S501). A consistency group is a range of BVOLs in which consistency is maintained, and more specifically, is a group having one or more volume groups comprising a remote copy pair (a PVOL/SVOL pair) and a BVOL corresponding thereto. For example, a consistency group specification can be received via a GUI (Graphical user Interface).

The data copy control unit 303 makes a determination as to whether or not different paths are being used for a plurality of remote copy pairs belonging to a specified consistency group (for example, whether or not at least one of a primary storage system having a PVOL that belongs to a specified consistency group, and a secondary storage system having an SVOL that belong to this consistency group are a plurality of storage systems) (S502). If the result of this determination is negative (S502: NO), the data copy control unit 303 selects the first mode, and sends a notification to at least the respective secondary storage systems that the first mode was selected (S503). If the result of the above-mentioned determination is affirmative (S502: YES), the data copy control unit 303 selects the second mode, and sends a notification to at least the respective secondary storage systems that the second mode was selected (S504).

Here, the determination of S502, for example, can be carried out by referencing the volume management table 2501 shown in FIG. 35B (For example, this table 2501 is stored in the memory 1513 of the host computer 10A.). More specifically, for example, the data copy control unit 303, upon receiving a plurality of specifications for a remote copy pair of a PVOL and a SVOL comprising one consistency group, proceeds to S504 when the data copy control unit 303 detects from the volume management table 2501 that one of a plurality of PVOLs and a plurality of SVOLs, which belong to a plurality of remote copy pairs, exists in a plurality of storage systems, and proceeds to S503 when this is not the case. Further, the data copy control unit 303 receives a specification for allocating which inter-storage system path is allocated to which remote copy pair constituting a consistency group, and if a path, which cannot be used by another remote copy pair, is specified for a certain remote copy pair, can proceed to S504, and if this is not the case (for example, if the same path is specified for all of the remote copy pairs), can proceeds to S503. The path can be a physical path or a logical path.

Figure 36A:
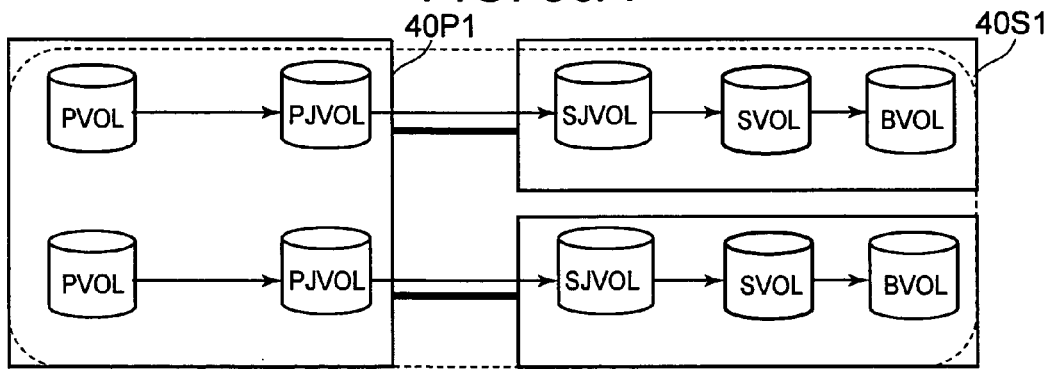
FIG. 36A shows an example of a plurality of SVOLs of one consistency group existing in a plurality of secondary storage systems.
Figure 36B:
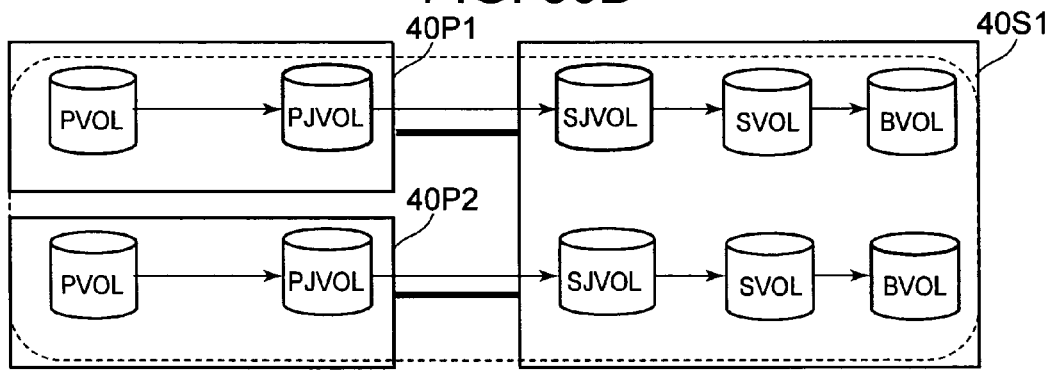
FIG. 36B shows an example of a plurality of PVOLs of one consistency group existing in a plurality of primary storage systems.
Figure 36C:
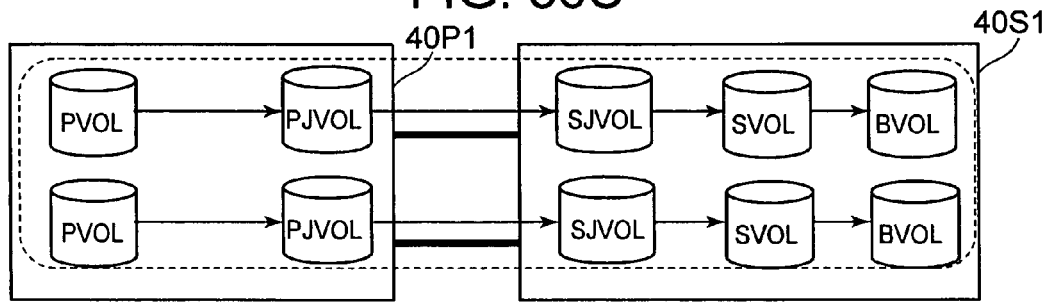
FIG. 36C shows an example of one or more PVOLs of one consistency group existing in one primary storage system, and one or more SVOLs existing in one secondary storage system.
Figure 36D:
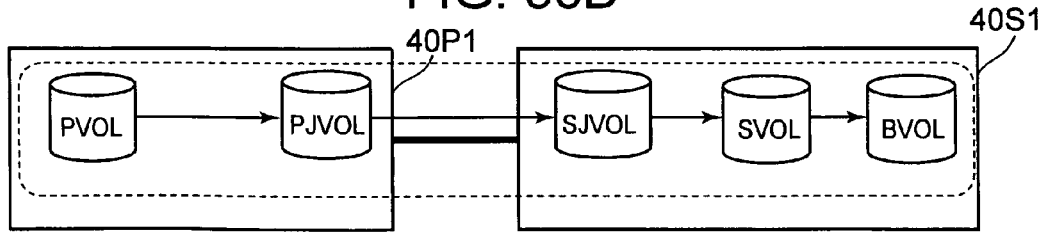
FIG. 36D shows an example with a single remote copy pair.

Based on the above, it is possible to treat a case in which a plurality of paths are used with a plurality of remote copy pairs as shown in FIGS. 36A through 36C as a case in which the data copy control unit 303 proceeds to S504, and the case of a single remote copy pair as shown in FIG. 36D, or a case in which one path is used for a plurality of remote copy pairs, as a case in which the data copy control unit 303 proceeds to S503.

Figure 37:
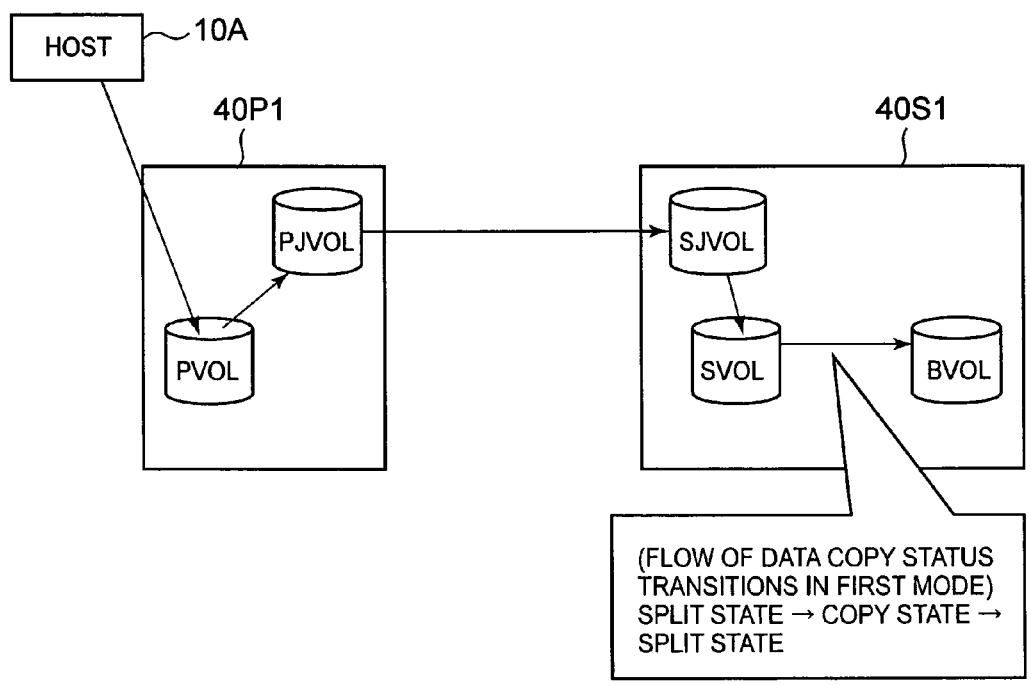
FIG. 37 shows an overview of the control implemented subsequent to a first mode being selected in a fifth embodiment of the present invention.

FIG. 37 shows an overview of the control carried out subsequent to the first mode being selected.

The secondary storage system receives information from the host computer 10A showing that the first mode was selected. In this case, the secondary storage system carries out the following control. That is, the secondary storage system sets the "data copy status" value to {split state} (for example, the above-mentioned {waiting} or {initial state}) until a journal up to a specified time has been established. The secondary storage system, upon detecting that a journal up to a specified time has been established, changes the "data copy status" value to {copy state} (for example, the above-mentioned {processing}), and executes a data copy from the SVOL to the BVOL (or reflects a journal from the SJVOL to the BVOL). When this has ended, the secondary storage system changes the "data copy status" value to {split state}. That is, upon receiving information from the host computer 10A showing that the first mode was selected, the secondary storage system executes a data copy from the SVOL to the BVOL (or reflects a journal from the SJVOL to the BVOL) without receiving a specified time data copy command if, after receiving a specified time data copy acquisition indication from the host computer 10A, the secondary storage system detects that a journal up to a specified time has been established. In other words, the host computer 10A does not send a specified time data copy command after sending a specified time data copy acquisition indication. In the first mode, the value of the "data copy status" is not changed to the above-described {preparation end state} value.

Figure 38:
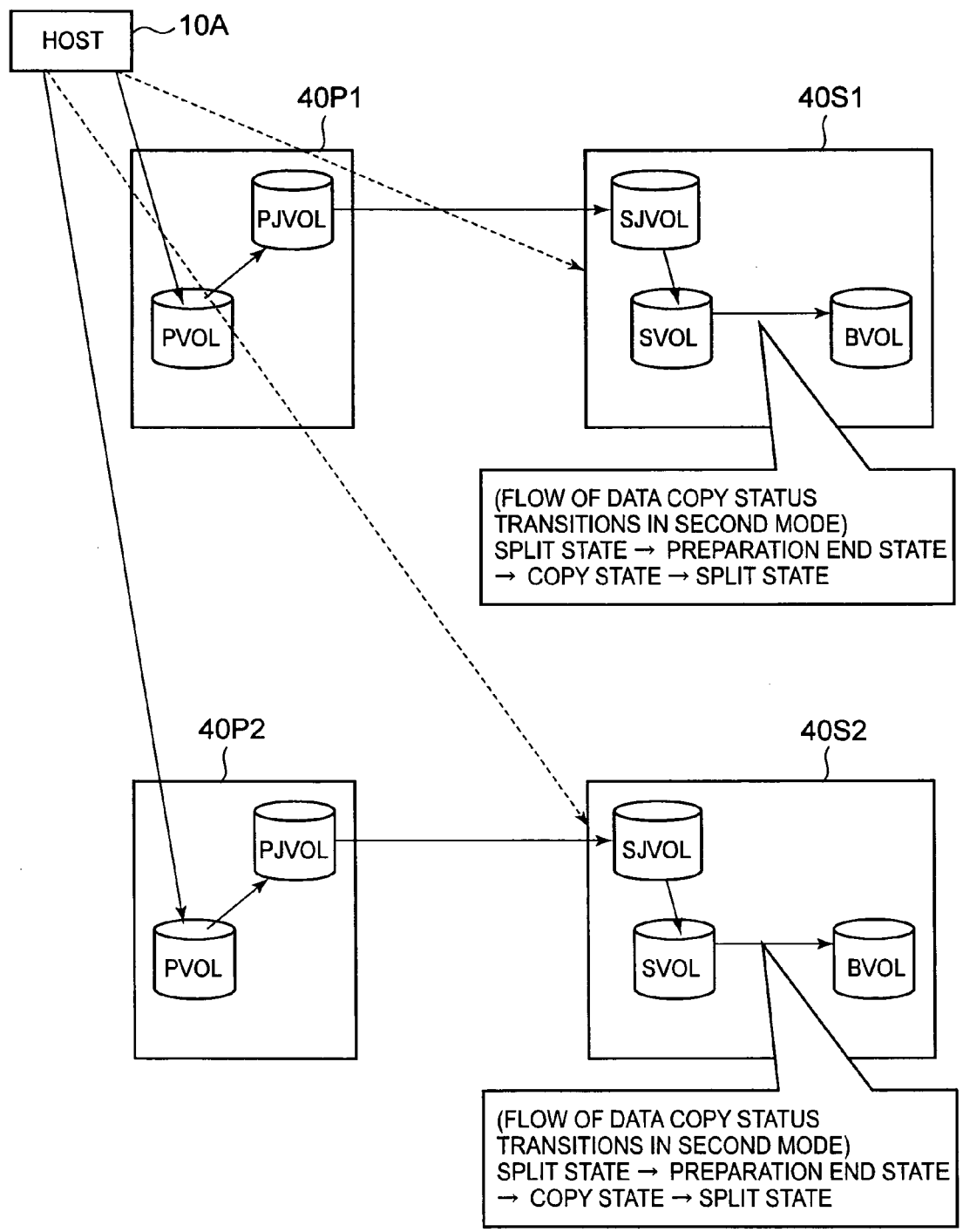
FIG. 38 shows an overview of the control implemented subsequent to a second mode being selected in a fifth embodiment of the present invention.

FIG. 38 shows an overview of the control carried out subsequent to the second mode being selected.

The respective secondary storage systems receive information from the host computer 10A showing that the second mode has been selected. In this case, the respective secondary storage systems carry out the control explained in any of the embodiments of the first through the fourth embodiment. That is, briefly stated, the secondary storage system sets the "data copy status" value to {split state} until a journal up to a specified time is established. The respective secondary storage systems, upon detecting that a journal up to a specified time has been established, change the "data copy status" value to {preparation end state}, and notify the host computer 10A that this post-change value is {preparation end state}. If all the "data copy status" values related to a consistency group are {preparation end state}, the host computer 10A sends a specified time data copy command to all of the secondary storage systems. If a specified time data copy command is received, the respective secondary storage systems change the "data copy status" value to {copy state}, and execute a data copy from the SVOL to the BVOL (or, reflect a journal from the SJVOL to the BVOL). When this has ended, the respective secondary storage systems change the "data copy status" value to {split state}.

In the second mode, upon detecting a failure related to a consistency group (for example, when {abnormal} is received as the value of the "remote copy status" or the "path status"), the host computer 10A can send a specified time data copy cancel command to the respective secondary storage systems. Further, in the second mode, upon detecting a recovery from a failure related to a consistency group (for example, when {normal} is received as the value of the "remote copy status" or the "path status" after having received {abnormal}), the host computer 10A can send a specified time data copy acquisition indication for another specified time to the respective secondary storage systems.

A number of embodiments of the present invention have been explained hereinabove, but these have been examples for explaining the present invention, and do not purport to limit the scope of the present invention solely to these embodiments. The present invention can be put into practice in a variety of other aspects as well.

For example, when the OS 103 of the host computer 10A is an open system OS, a primary storage system can create a journal comprising time information showing the time when a write command was received, and write same to the PJVOL.

Further, for example, the data copy indication information table 309, primary data copy management table 407, and secondary data copy management table 508 can be prepared for each respective consistency group. In this case, a specified time data copy acquisition indication and a specified time data copy command can comprise a consistency group identifier. Further, in this case, when {preparation end state} is received as the "data copy status" value for all the remote copy pairs belonging to a targeted consistency group, the host computer 10A can send a specified time data copy command to all the secondary storage systems 40S related to this targeted consistency group as shown by the broken-line arrows.

What is claimed is:

1. A computer system, comprising:
one or more secondary storage systems connected to one or more primary storage systems having a plurality of primary logical volumes; and
a controller for controlling said one or more secondary storage systems, wherein
said one or more secondary storage systems comprise a plurality of secondary logical volumes, which constitute a plurality of volume pairs respectively with said plurality of primary logical volumes, and receive a journal comprising time information and data, which is written to a primary logical volume,
the respective secondary storage systems comprising:
a logical volume for backup use;
a journal storage resource;
a journal control unit, which writes a received journal to said journal storage resource, and writes to said secondary logical volume data inside a journal, which is stored in said journal storage resource, and which has not been written to said secondary logical volume;
a time specification receiving unit for receiving from said controller a specification for a specified time, which is a time specifying a time in the future relative to the current time;
a status management unit, which when detecting a journal comprising time information denoting a time beyond said specified time or when learning that there is no journal comprising time information showing a time in the future relative to said specified time in a primary storage system, which comprises a primary logical volume constituting a volume pair with said secondary logical volume, sets a backup preparation end state for said backup logical volume, and sends information showing said preparation end state to said controller; and
a backup execution unit for executing a backup process, which writes data up to said specified time in said backup logical volume when receiving a backup command from said controller, and
said controller comprising:
a time specification unit for specifying said specified time to all of said one or more secondary storage systems; and
a backup control unit for sending a backup command to all of said one or more secondary storage systems when receiving information showing said preparation end state from all of said one or more secondary storage systems.

2. The computer system according to claim 1, wherein said journal control unit writes to said secondary logical volume the data in a journal comprising time information showing a time prior to or contemporaneous said specified time, but does not write to said secondary logical volume the data in a journal comprising time information showing a time in the future relative to said specified time, and said backup execution unit executes a data copy from said secondary logical volume to said backup logical volume when said backup command has been received.

3. The computer system according to claim 2, wherein pair states of a volume pair, which has said secondary logical volume as a copy source and said backup logical volume as a copy destination, include a split state which is a state in which said backup logical volume is not updated when said secondary logical volume is updated, said preparation end state, and a copy state which is a state in which said backup logical volume is updated when said secondary logical volume is updated, said status management unit sets said pair state to said split state either prior to a journal comprising time information denoting a time in the future relative to said specified time being written to said journal storage resource, or prior to learning that a journal comprising time information showing a time in the future relative to said specified time is not stored in a primary storage system which comprises a primary logical volume constituting a volume pair with said secondary logical volume, sets said pair state to said preparation end state either when detecting a journal comprising time information denoting a time in the future relative to said specified time, or when learning that a journal comprising time information showing a time in the future relative to said specified time is not stored in a primary storage system which comprises a primary logical volume constituting a volume pair with said secondary logical volume, sets said pair state to said copy state when said backup command has been received, and sets said pair state to said split state when said data copy ends, and said backup execution unit executes said data copy in response to said pair state being changed from said preparation end state to said copy state, and writes data in a journal comprising time information denoting a time in the future relative to said specified time, to said secondary logical volume in response to said pair state being changed from said copy state to said split state.

4. The computer system according to claim 1, wherein said backup execution unit is constituted so as to write data in a journal read from said journal storage resource, to said backup logical volume as said backup process, and upon receiving said backup command, writes data in journal, from a time subsequent to a time denoted in time information inside a journal having data written at the end of the immediately prior backup process, up to said specified time, in said backup logical volume.

5. The computer system according to claim 1, wherein there is one backup logical volume for one volume pair of said primary logical volume and said secondary logical volume.

6. The computer system according to claim 1, wherein said status management unit of said respective secondary storage systems sends to said controller information showing an abnormal state, when an abnormality is detected for a volume pair having said secondary logical volume of this secondary storage system.

7. The computer system according to claim 6, wherein said time specification unit sends a cancel command to all of said one or more secondary storage systems, when receiving information showing said abnormal state, from at least one of said one or more secondary storage systems, and said backup execution unit cancels said preparation end state in response to receiving said cancel command from said controller.

8. The computer system according to claim 6, wherein said journal control unit writes to said secondary logical volume data in journal of a time prior to or contemporaneous a fixed time prior to the current time, and said time specification unit, when receiving information showing said abnormal state from at least one of said one or more secondary storage systems, acquires from the secondary storage system which is a source of the information showing said abnormal state, time information corresponding to a journal comprising data recently written to said secondary logical volume, and specifies a time denoted in this time information as said specified time to all of said one or more secondary storage systems.

9. The computer system according to claim 6, wherein said time specification unit, when receiving information showing said abnormal state from at least one of said one or more secondary storage systems, specifies a time in the future relative to said specified time as a new specified time to all of said one or more secondary storage systems.

10. The computer system according to claim 6, wherein said time specification unit, subsequent to specifying said specified time to all of said one or more secondary storage systems, sends a cancel command to all of said one or more secondary storage systems if neither information showing said preparation end state nor information showing said abnormal state is received from at least one of said one or more secondary storage systems after passage of a fixed time, and said backup execution unit cancels said preparation end state in response to receiving said cancel command from said controller.

11. The computer system according to claim 1, wherein said backup execution unit, subsequent to sending information showing said preparation end state, either cancels said preparation end state when a backup command is not received from said controller after passage of a first wait time or executes said backup process for either said backup logical volume or for another backup logical volume.

12. The computer system according to claim 11, wherein said time specification unit is constituted so as to send a prescribed command to all of said one or more secondary storage systems if a prescribed type of information is not received from at least one of said one or more secondary storage systems after passage of a second wait time, and said first wait time is longer than said second wait time.

13. The computer system according to claim 1, wherein said controller further comprises:

a pair specification receiving unit for receiving a specification for one or more volume pairs as a range in which consistency is maintained;

a determination unit for determining whether or not a different path is used in journal transfer for specified one or more volume pairs; and a notification unit for notifying information related to determination results to a secondary storage system, of said one or more secondary storage systems, which is related to said specified one or more volume pairs, and wherein said status management unit of said respective secondary storage systems is constituted so as to set said preparation end state when received information is information related to an affirmative determination result, and thereafter, to execute said backup process upon receiving a backup command, and to not set said preparation end state when the received information is information related to a negative determination result, and to execute said backup process without setting said preparation end state and without receiving said backup command.

14. The computer system according to claim 1, wherein said controller is any one of one or more higher-level devices for updating said plurality of primary logical volumes; any one of said one or more primary storage systems; any one of said one or more secondary storage systems; any one of one or more higher-level devices connected to said one or more secondary storage systems; and any one of management computers that manage said one or more secondary storage systems.

15. A secondary storage system, which receives a journal having time information and data to be written to a primary logical volume from a primary storage system, comprising:
 a secondary logical volume;
 a logical volume for backup use;
 a journal storage resource;
 a journal control unit, which writes a received journal to said journal storage resource, and writes to said secondary logical volume data in a journal which is stored in said journal storage resource, and which has not been written to said secondary logical volume;
 a time specification receiving unit for receiving from a controller a specification for a specified time, which is a time that specifies a time in the future relative to the current time;
 a status management unit, which when detecting a journal comprising time information denoting a time beyond said specified time or when learning that there is no journal comprising time information showing a time in the future relative to said specified time in a primary storage system which comprises a primary logical volume constituting a volume pair with said secondary logical volume, sets a backup preparation end state for said backup logical volume, and sends to said controller information showing said preparation end state; and
 a backup execution unit for executing a backup process which writes data up to said specified time in said backup logical volume when receiving a backup command from said controller.

16. A controller, which controls one or more secondary storage systems which are connected to one or more primary storage systems having a plurality of primary logical volumes, comprise a plurality of secondary logical volumes constituting respective volume pairs with said plurality of primary logical volumes, respectively receive from a primary storage system a journal comprising time information and data which is written in a primary logical volume, and execute a backup process for writing data in journal up to a specified time which is a time that specifies a time in the future relative to the present time in a backup logical volume, said controller comprising:
 a time specification unit for specifying a specified time which is a time that specifies a time in the future relative to the current time to all of said one or more secondary storage systems; and
 a backup control unit for sending a backup command to all of said one or more secondary storage systems when receiving information showing a backup preparation end state for a backup logical volume from all of said one or more secondary storage systems.

17. A backup control method in a computer system for sending a journal having time information and data to be written in a primary logical volume from one or more primary storage systems comprising a plurality of primary logical volumes to one or more secondary storage systems comprising a plurality of secondary logical volumes constituting respective volume pairs with said plurality of primary logical volumes, causing each of said one or more secondary storage systems to store a received journal in a journal storage resource, and writing data in the journal stored in this journal storage resource, to said secondary logical volume,
 said method comprising the steps of:
 setting a specified time which is a time that specifies a time in the future relative to the current time in all of said one or more secondary storage systems;
 setting a backup preparation end state for a backup logical volume, and reporting information showing said preparation end state to each of said one or more secondary storage systems, either when detecting a journal comprising time information denoting a time beyond said specified time or when learning that there is no journal comprising time information showing a time in the future relative to said specified time in a primary storage system which comprises a primary logical volume constituting a volume pair with said secondary logical volume; and
 issuing a backup command to all of said one or more secondary storage systems when information showing said preparation end state is reported from all of said one or more secondary storage systems.

18. The backup control method according to claim 17, further comprising a step of issuing a cancel order to all of said one or more secondary storage systems signifying deletion of said preparation end state when information showing an abnormal state for a volume pair having a secondary logical volume of this secondary storage system is reported from at least one of said one or more secondary storage systems.

* * * * *